United States Patent
Aoki

(10) Patent No.: US 8,860,871 B2
(45) Date of Patent: Oct. 14, 2014

(54) IMAGING DEVICE AND COMPUTER READABLE MEDIUM HAVING A FOCUSING CONTROL FUNCTION

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/039,465

(22) Filed: Sep. 27, 2013

(65) Prior Publication Data

US 2014/0022439 A1    Jan. 23, 2014

Related U.S. Application Data

(63) Continuation of application No. PCT/JP2012/058196, filed on Mar. 28, 2012.

(30) Foreign Application Priority Data

Apr. 1, 2011 (JP) .................................. 2011-081405

(51) Int. Cl.
- *G03B 13/00* (2006.01)
- *H04N 5/232* (2006.01)
- *H04N 5/369* (2011.01)
- *G02B 7/34* (2006.01)
- *G02B 15/14* (2006.01)
- *G03B 13/36* (2006.01)

(52) U.S. Cl.
CPC .............. *G02B 15/14* (2013.01); *H04N 5/3696* (2013.01); *G03B 13/36* (2013.01); *G02B 7/346* (2013.01); *H04N 5/23212* (2013.01)
USPC .......................... 348/347; 348/345; 348/220.1

(58) Field of Classification Search
CPC ........................... H04N 5/23212; H04N 5/3696
USPC .......................................................... 348/347
See application file for complete search history.

(56) References Cited

U.S. PATENT DOCUMENTS 8,036,521 B2   10/2011 Ono et al.
2010/0150538 A1   6/2010 Ono et al.
(Continued)

FOREIGN PATENT DOCUMENTS

| JP | 11-196311 A | 7/1999 |
| JP | 2002-14277 A | 1/2002 |
| JP | 2006-208495 A | 8/2006 |
| JP | 2007-60706 A | 3/2007 |
| JP | 2007-65330 A | 3/2007 |

(Continued)

OTHER PUBLICATIONS

International Preliminary Report on Patentability, issued in PCT/JP2012/058196, dated Apr. 23, 2013.

(Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

An imaging device includes a capturing lens; an imaging element in which a pair of horizontal light receiving units receiving a pair of split light of a horizontal direction and a pair of vertical light receiving units receiving a pair of split light of a vertical direction are two-dimensionally arranged; a movement unit that moves the imaging lens in the optical axis direction; a specifying unit that specifies one of the pair horizontal light receiving units or the pair vertical light receiving units, of which the calculated absolute value of the signal amount difference is smaller; and a control unit that performs correlation computation based on the signal amount of the plural photoelectric conversion elements aligned in a direction of the specified one of the pair of horizontal light receiving units or the pair of vertical light receiving units and controls the movement unit based on the correlation computation.

8 Claims, 15 Drawing Sheets

(56) References Cited

U.S. PATENT DOCUMENTS

| | | |
|---|---|---|
| 2010/0157094 A1* | 6/2010 | Takamiya .................. 348/229.1 |
| 2010/0194967 A1* | 8/2010 | Amano ......................... 348/345 |
| 2011/0037888 A1* | 2/2011 | Onuki ........................... 348/340 |
| 2011/0096211 A1* | 4/2011 | Oikawa et al. ............... 348/273 |
| 2011/0164166 A1 | 7/2011 | Oikawa |
| 2011/0273608 A1* | 11/2011 | Tsukada ...................... 348/345 |
| 2012/0188425 A1* | 7/2012 | Kita .............................. 348/294 |
| 2013/0278730 A1* | 10/2013 | Hasegawa et al. ............. 348/49 |
| 2014/0022445 A1* | 1/2014 | Aoki et al. .................... 348/353 |

FOREIGN PATENT DOCUMENTS

| | | |
|---|---|---|
| JP | 2008-216719 A | 9/2008 |
| JP | 2010-107770 A | 5/2010 |
| JP | 2010-139942 A | 6/2010 |

OTHER PUBLICATIONS

International Search Report, issued in PCT/JP2012/058196, dated Jul. 3, 2012.

PCT/ISA/237, issued in PCT/JP2012/058196, dated Jul. 3, 2012.

* cited by examiner

INFLUENCE ON SIGNAL AMOUNT DIFFERENCE BETWEEN PAIRED SPLIT PHOTOELECTRIC CONVERSION UNITS IN HORIZONTAL DIRECTION IS LARGE

INFLUENCE ON SIGNAL AMOUNT DIFFERENCE BETWEEN PAIRED SPLIT PHOTOELECTRIC CONVERSION UNITS IN VERTICAL DIRECTION IS SMALL

IMAGING DEVICE AND COMPUTER READABLE MEDIUM HAVING A FOCUSING CONTROL FUNCTION

CROSS-REFERENCE TO RELATED APPLICATIONS

This application is a continuation application of International Application No. PCT/JP2012/058196, filed Mar. 28, 2012, which is incorporated herein by reference. Further, this application claims priority from Japanese Patent Application No. 2011-081405, filed Apr. 1, 2011, which is incorporated herein by reference.

TECHNICAL FIELD

The present invention relates to an imaging device with a focusing control function and a computer readable medium for storing a program.

BACKGROUND ART

In recent years, there has been an increasing demand for information equipment, such as digital electronic still cameras, digital video cameras, mobile phones, and PDAs (Personal Digital Assistants), having a capturing function in accordance with high resolution of solid-state imaging devices such as CCD (Charge Coupled Device) area sensors, and CMOS (Complementary Metal Oxide Semiconductor) image sensors. Furthermore, the information equipment having the above-described capturing function is referred to as an imaging device.

As a technique relating to this type of imaging device, however, there is a known technique which performs focusing control by detecting a phase difference using image information obtained by the solid-state imaging element (performs AF (Auto Focus) control by a so-called phase-difference AF system) to provide an imaging device capable of performing AF control with high accuracy.

The principle of the phase-difference AF system will be described below.

As an example, as illustrated in FIG. 15, light from a specific point on an object is divided into a beam ΦLa that passes through a pupil corresponding to point "A" and enters the point "A" and a beam ΦLb that passes through a pupil corresponding to point "B" and enters the point "B". Since these two beams are emitted from one original point, if a focal point of a camera lens matches on a light receiving surface (imaging surface) of the solid-state imaging device, the two beams will arrive at one point on the same microlens as illustrated in FIG. 15A. However, for example, if the focal point of the camera lens is formed in front, by an "x" distance, from the light receiving surface of the solid-state imaging device, the two beams are misaligned from each other by 2θx, as illustrated in FIG. 15B. Therefore, if the focal point of the camera lens is formed at a back side, by the "x" distance, from the light receiving surface of the solid-state imaging device, arrival points of the beams are misaligned from each other by 2θx in the reverse direction.

Based on this principle, an image formed by an alignment of points "A" and an image formed by an alignment of points "B" match with each other if the camera lens is in-focus, and the images are misaligned with each other if the camera lens is out of focus.

As techniques based on this principle, techniques disclosed in Patent Document 1 (Japanese Patent Application Laid-Open (JP-A) No. 2002-14277), Patent Document 2 (JP-A No. 2010-107770), and Patent Document 3 (JP-A No. 2006-208495) are known. Patent Document 1 (JP-A No. 2002-14277) discloses a technique including: comparing two images formed by light which passes through pupils of different positions in a capturing lens; correcting at least one of the two images based on the comparison result; and detecting a focal point of the imaging lens by performing a correlation computation on the corrected image signal.

Further, Patent Document 2 (JP-A No. 2010-107770) discloses an imaging device including: a photoelectric conversion unit that is provided with a first pixel group which photoelectrically converts an object image from a first exit pupil region of an imaging lens and a second pixel group which photoelectrically converts an object image from a second exit pupil region different from the first exit pupil region; a focus detection unit that performs focus detection of the capturing lens using a first image signal obtained from the first pixel group and a second image signal obtained from the second pixel group; a calculation unit that calculates an inclination with respect to an alignment direction of pixels of the first and second pixel groups, which is a straight line formed by joining a center of the first exit pupil region and a center of the second exit pupil region; and a focus detection range setting unit that sets a focus detection range based on the calculation result by the calculation unit.

Further, Patent Document 3 (JP-A No. 2006-208495) discloses a focus detector provided with a reimaging lens that reimages a beam transmitted through a capturing lens and a plurality of photoelectric conversion units that receive the reimaged beam through a microlens and convert the received beam into an image signal, wherein the focus detector includes a focus state detection unit that detects a focus state of the capturing lens based on the converted image signal. In this focus detector, the reimaging lens has a plurality of pupil regions which transmit the beam transmitted from the imaging lens, the plurality of photoelectric conversion units each receive the beam transmitted from the pupil region through the microlens and each convert the received beam into the plurality of image signals, and the focus state detection unit detects the focus state of the capturing lens based on a relative positional relationship of the plurality of image signals which are each converted by the plurality of photoelectric conversion units.

However, in all of the techniques disclosed in Patent Document 1 (JP-A No. 2002-14277), Patent Document 2 (JP-A No. 2010-107770), and Patent Document 3 (JP-A No. 2006-208495), since a pupil split is performed, a light quantity received by the solid-state imaging element of point "A" and a light quantity received by the solid-state imaging element of point "B" are different from each other depending on an incident angle, as illustrated in FIG. 15, and in a general capturing lens, for example, the light quantity (sensitivity) received by point "A" is different from the light quantity (sensitivity) received by point "B" in a central portion and circumferences of an angular field, as illustrated in FIG. 16. Therefore, since the light quantity greatly depends on the incident angle of incident light and the solid-state imaging element, in general, each electric signal output from each solid-state imaging element of points A and B is subjected to the correlation computation after correction processing.

SUMMARY OF INVENTION

Technical Problem

However, even in a case of providing a configuration to perform correction on each electric signal output from each solid-state imaging element, if light enters a focusing target region from an angle which causes, for example, a ghost to be generated, a difference (difference which is difficult to anticipate in advance) which is not assumed to be a difference in signal amount between electric signals output from a solid-state imaging element of point "A" and a solid-state imaging element of point "B" occurs. Therefore, as a result, the accuracy of focus detection is decreased.

The present invention is directed to an imaging device and a computer readable medium for storing a program capable of suppressing decrease in the accuracy of focus detection.

Solution to Problem

According to a first aspect of the present invention, there is provided an imaging device including: a capturing lens that is movable in an optical axis direction; an imaging element in which a pair of horizontal light receiving unit, which are aligned in a horizontal direction, configured to receive a pair of split light of the horizontal direction which is obtained by performing a pupil split on light incident to the capturing lens in the horizontal direction, and a pair of vertical light receiving unit, which are in a vertical direction, configured to receive a pair of split light of the vertical direction which is obtained by performing the pupil split on light incident to the capturing lens in the vertical direction are two-dimensionally arranged; a movement unit that moves the capturing lens in the optical axis direction; a specifying unit that specifies a greater one of a degree of signal amount coincidence between electric signals obtained by the pair of horizontal light receiving unit and a degree of signal amount coincidence between electric signals obtained by the pair of vertical light receiving unit; and a control unit that controls the movement unit so as to move the capturing lens to a focusing position based on a signal amount corresponding to the degree of coincidence specified by the specifying unit.

Further, according to a second aspect of the present invention, in the imaging device of the first aspect, the control unit may control the movement unit so as to move the capturing lens to the focusing position based on a signal amount corresponding to the degree of coincidence, if the degree of coincidence specified by the specifying unit exceeds a predetermined degree of coincidence; and control the movement unit so as to move the capturing lens to a position on an optical axis in which an evaluation value for evaluating sharpness of an object image to be generated based on an electric signal obtained from the imaging element becomes an evaluation value at the time of focusing, if the degree of coincidence specified by the specifying unit is the predetermined degree of coincidence or less.

Further, according to a third aspect of the present invention, in the imaging device of the second aspect, the control unit may control the movement unit so as to move the capturing lens to the focusing position based on a signal amount corresponding to the degree of coincidence specified by the specifying unit, if both of the degree of signal amount coincidence between the electric signals obtained by the pair of horizontal light receiving unit and the degree of signal amount coincidence between the electric signals obtained by the pair of vertical light receiving unit exceed the predetermined degree of coincidence; and control the movement unit so as to move the capturing lens to a position on an optical axis in which the evaluation value for evaluating the sharpness of the object image to be generated based on the electric signal obtained from the imaging element becomes an evaluation value at the time of focusing, if at least one of the degree of signal amount coincidence between the electric signals obtained by the pair of horizontal light receiving unit and the degree of signal amount coincidence between the electric signals obtained by the pair of vertical light receiving unit is the predetermined degree of coincidence or less.

Further, according to a fourth aspect of the present invention, in the imaging device of any one of the first to third aspects, the control unit may further control the movement unit so as to move the capturing lens to the focusing position, based on a signal amount between electric signals obtained by light receiving units, which are paired with each other in a specified oblique direction toward the imaging element, out of each light receiving unit of the pair of horizontal light receiving unit and the pair of vertical light receiving unit of the plurality of photoelectric conversion elements, without performing the specifying and the controlling, if both of the degree of signal amount coincidence between the electric signals obtained by the pair of horizontal light receiving unit and the degree of signal amount coincidence between the electric signals obtained by the pair of vertical light receiving unit exceed the predetermined degree of coincidence and is equal to or less than the other predetermined degree of coincidence exceeding the predetermined degree of coincidence.

Further, according to a fifth aspect of the present invention, in the imaging device of the fourth aspect, the imaging device may further include a derivation unit that derives the paired light receiving units in the specified oblique direction from a plurality of oblique directions with respect to the imaging element, based on a difference between each of the degree of coincidence of the signal amount between the electric signals obtained by the pair of horizontal light receiving unit and the degree of signal amount coincidence between the electric signals obtained by the pair of vertical light receiving unit and the other predetermined degree of coincidence.

Further, according to a sixth aspect of the present invention, in the imaging device of any one of the first to fifth aspects, the control unit may perform the control using light which is incident to a split region, in which a total value of the signal amount between the electric signals obtained by the pair of horizontal light receiving unit and the signal amount between the electric signals obtained by the pair of vertical light receiving unit is minimum, out of a plurality of split regions obtained by splitting the focusing target region.

Further, according to a seventh aspect of the present invention, in the imaging device of any one of the first to sixth aspects, the imaging element may be configured in units of pixels.

Meanwhile, an eighth aspect of the present invention provides a computer readable medium that stores a program for causing a computer to function as: a specifying unit that specifies a greater one of a degree of signal amount coincidence between electric signals obtained by a pair of horizontal light receiving units or a degree of signal amount coincidence between electric signals obtained by a pair of vertical light receiving units, the pair of horizontal light receiving units and the pair of vertical light receiving units being contained in an imaging element in which the pair of horizontal light receiving units and the pair of vertical light receiving units are two-dimensionally arranged, the pair of horizontal light receiving units being aligned in a horizontal direction to receive a pair of split light of the horizontal direction obtained by performing a pupil split on light incident to a capturing lens, which is movable in an optical axis direction, in the horizontal direction, and the pair of vertical light receiving units being aligned in a vertical direction to receive a pair of split light of the vertical direction obtained by performing the pupil split on light incident to the capturing lens in the vertical direction; and a control unit that controls a movement unit for moving the imaging lens to an optical axis direction so as to move the capturing lens to a focusing position based on a signal amount corresponding to the degree of coincidence specified by the specifying unit.

Advantageous Effects of Invention

According to the present invention, it is possible to suppress decrease in accuracy of focus detection.

DESCRIPTION OF EMBODIMENTS

Embodiments of the present invention will be described in detail below with reference to drawings. Furthermore, with respect to the case in which the present invention is applied to as a digital electronic still camera (hereinafter, referred to as a "digital camera") that captures a still image, it will be described here. It is assumed that a term "horizontal direction" used in following embodiments is a direction uniquely defined in a predetermined plane, and a term "vertical direction" used in following embodiments is a direction forming an angle of 90 degrees with respect to the horizontal direction in the predetermined plane and also includes an error of a predetermined angle (for example, ±1 degree).

[First Embodiment]

First, main components of an electrical system of a digital camera 10 according to the present embodiment will be described with reference to FIG. 1.

Figure 1:
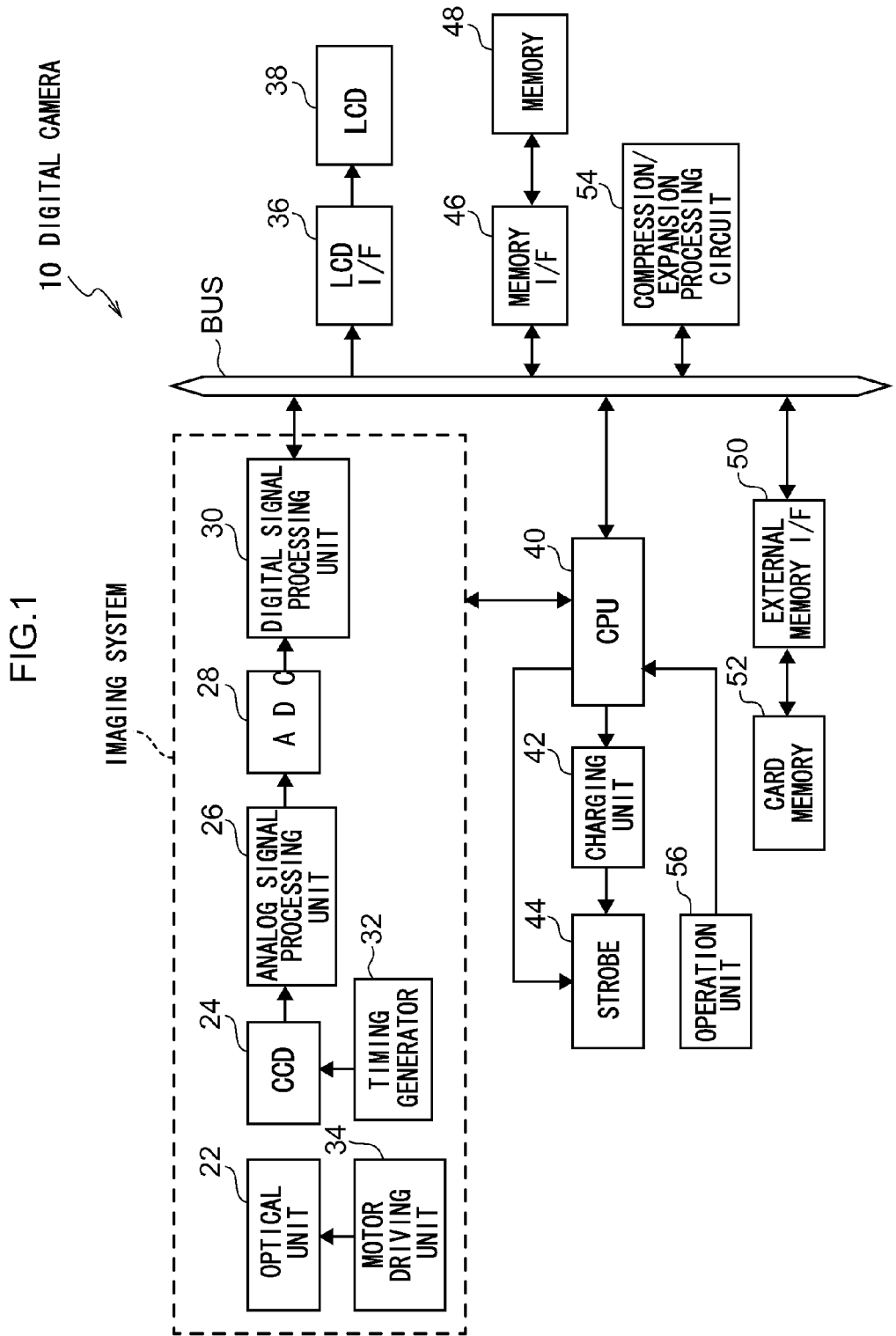
FIG. 1 is a block diagram illustrating an example of main components of an electrical system of a digital camera according to embodiments.

As illustrated in FIG. 1, the digital camera 10 according to the present embodiment is configured to include an optical unit 22 which is configured to include a lens for forming an object image, a charge-coupled device (hereinafter, referred to as a "CCD") 24 which is arranged at the rear of an optical axis of the lens, and an analog signal processing unit 26 which performs various types of analog signal processing on an input analog signal.

Further, the digital camera 10 is configured to include an analog/digital converter (hereinafter, referred to as an "ADC") 28 that converts the input analog signal into a digital data and a digital signal processing unit 30 that performs various types of digital signal processing on the input digital data.

Furthermore, the digital signal processing unit 30 incorporates a line buffer having a predetermined capacity and also performs a control which allows the input digital data to be stored in a predetermined region of a memory 48 to be described later.

An output terminal of a CCD 24 is connected to an input terminal of the analog signal processing unit 26, an output terminal of the analog signal processing unit 26 is connected to an input terminal of the ADC 28, and an output terminal of the ADC 28 is connected to an input terminal of the digital signal processing unit 30. Accordingly, a predetermined analog signal processing is performed on the analog signal indicating the object image, which is output from the CCD 24, by the analog signal processing unit 26, and then the analog signal is input to the digital signal processing unit 30 after being converted into a digital image data by the ADC 28.

Meanwhile, the digital camera 10 is configured to include a liquid crystal display (hereinafter, referred to as an "LCD") 38 that displays an image obtained by the capturing, a menu screen or the like, an LCD interface 36 that generates a signal, which is used to display the image, the menu screen or the like on the LCD 38, to supply the generated signal to the LCD 38, a CPU (Central Processing Unit) 40 that controls an overall operation of the digital camera 10, a memory 48 that includes a primary storage unit which temporarily stores the digital image data obtained by the capturing and a secondary storage unit which stores information to be maintained even when power is turned off, and a memory interface 46 that controls an access to the memory 48.

Further, the digital camera 10 is configured to include an external memory interface 50 that is used to access a portable memory card 52 to the digital camera 10 and a compression/expansion processing circuit 54 that performs a compression processing and an expansion processing on the digital image data.

Furthermore, the digital camera 10 according to the present embodiment employs a flash memory as the memory 48 and an xD picture card (registered trademark) as the memory card 52, but needless to say, the present invention is not limited thereto.

The digital signal processing unit 30, the LCD interface 36, the CPU 40, the memory interface 46, the external memory interface 50, and the compression/expansion processing circuit 54 are connected to each other through a system BUS. Therefore, the CPU 40 performs the operation control of the digital signal processing unit 30 and the compression/expansion processing circuit 54, the display various types of information on the LCD 38 through the LCD interface 36, and the access to the memory 48 and the memory card 52 through the memory interface 46 or the external memory interface 50, respectively.

Meanwhile, a timing generator 32, which generates a timing signal (pulse signal) for mainly driving the CCD 24 to supply the generated timing signal to the CCD 24, is provided in the digital camera 10, and the driving of the CCD 24 is controlled through the timing generator 32 by the CPU 40.

Furthermore, a motor driving unit 34 is provided in the digital camera 10, and the driving of a focus adjustment motor, a zoom motor, and a diaphragm driving motor, which are provided in the optical unit 22 but are not illustrated in the drawings, is controlled through the motor driving unit 34 by the CPU 40.

That is, the lens according to the present embodiment includes a plurality of lenses and is configured in the form of a zoom lens system capable of changing (changing magnification) the focus distance. Moreover, the lens is provided with a lens driving mechanism which is not illustrated in drawings. This lens driving mechanism includes the focus adjustment motor, the zoom motor, and the diaphragm driving motor, and these motors are driven by a driving signal, which is supplied from the motor driving unit 34 under the control of the CPU 40, respectively.

Furthermore, the digital camera 10 is provided within operation unit 56 that is configured to include various types of switches. Various types of switches include a release switch (so-called a shutter) that is operated to press during the capturing, a power switch that is operated to switch ON/OFF of the power of the digital camera 10, a mode switching switch that is operated so that a user sets any one of a capturing mode which performs the capturing or a playback mode which plays back an image obtained by the capturing on an LCD 38, a menu switch that is operated to press in case of displaying a menu screen on the LCD 38, a determination switch that is operated to press in case of determining operational contents until now, and a cancel switch that is operated to press in case of cancelling the last operational content. The operation unit 56 is connected to the CPU 40. Accordingly, the CPU 40 can constantly find out an operation state with respect to the operation unit 56.

Furthermore, it is assumed that the release switch of the digital camera 10 according to the present embodiment is configured so that two-stage pressing operations, which include a state of holding the release switch down to a half-way position (hereinafter, referred to as a "half-pressed state") and a state of holding the release switch down to a full position (hereinafter, referred to as a "fully pressed state") beyond the half-way position, can be detected.

Then, in the digital camera 10, as the release switch is half-pressed, exposure conditions (shutter speed, diaphragm condition) is set by activating an AE (Automatic Exposure) function, and then a focusing control is performed by activating an AF function. Subsequently, as the release switch is fully pressed, exposure (capturing) is carried out.

Further, the digital camera 10 is provided with a strobe 44 that flashes light for illuminating an object as necessary during the capturing and a charging unit 42 that is interposed between the strobe 44 and the CPU 40 to charge the power which allows the strobe 44 to flash the light under a control of the CPU 40. Moreover, the strobe 44 is also connected to the CPU 40, and thus the flash of the strobe 44 is controlled by the CPU 40.

Next, a configuration of the CCD 24 according to the present embodiment will be described with reference to FIGS. 2 and 3. Furthermore, FIG. 2 is a plane view illustrating a pixel structure of the CCD 24, and FIG. 3 is a plane view illustrating an entire configuration of the CCD 24.

Figure 2:
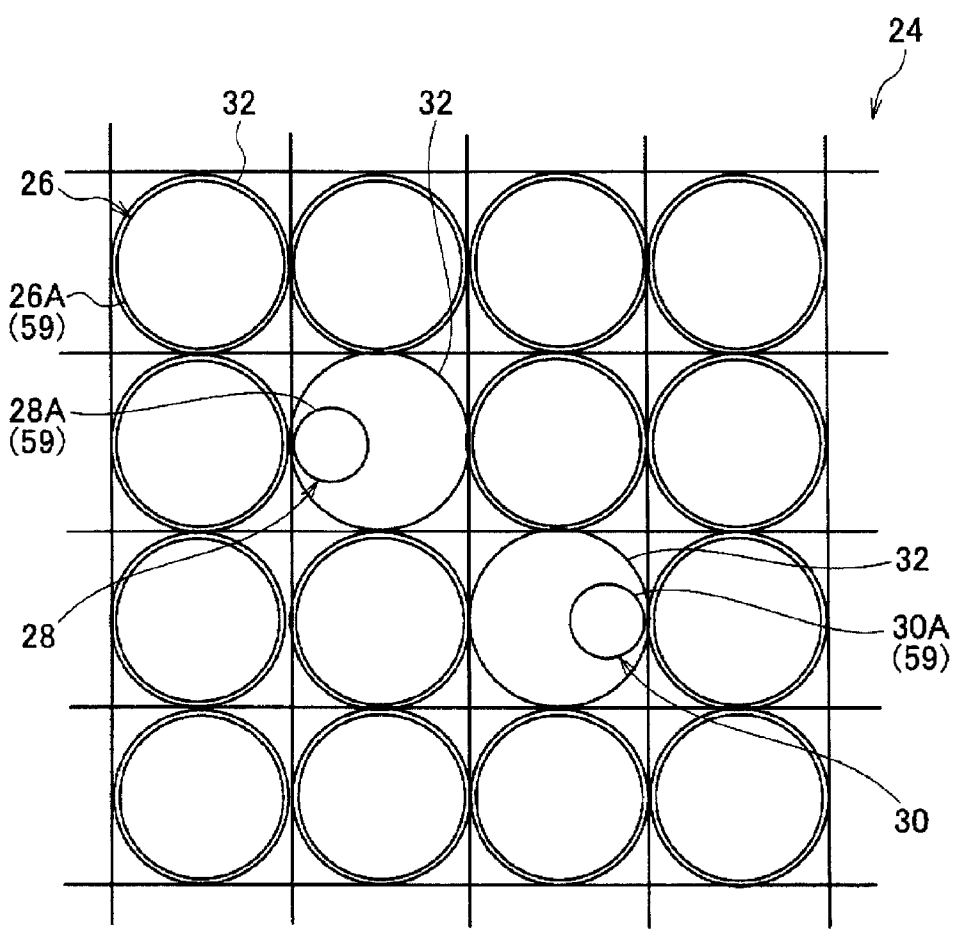
FIG. 2 is a schematic plane view illustrating an example a pixel structure of a CCD according to a first embodiment.
Figure 3:
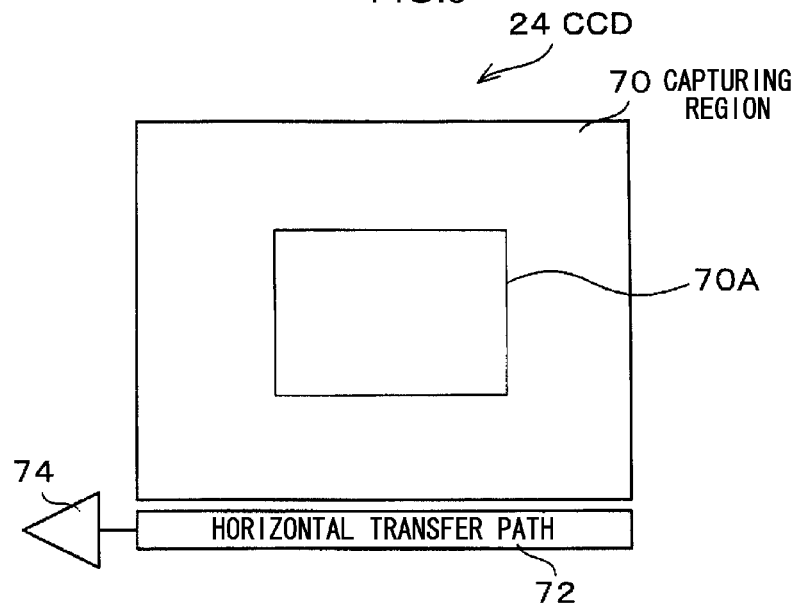
FIG. 3 is a schematic plain view illustrating an example of an entire configuration of the CCD according to the embodiments.

As illustrated in FIG. 2, the CCD 24 according to the present embodiment is configured so that a plurality of photoelectric conversion elements 59 (element including a light receiving unit for receiving the light), which constitutes each pixel, receive the light, and photoelectrically convert the received light into an electric signal in response to the amount of received light, are arranged in a matrix form (as an example, the photoelectric conversion elements has ten million pieces in the present embodiment). The pixels arrayed in the CCD 24 is divided broadly into imaging pixels 26 used to acquire the electric signal for the capturing and first AF pixels 28 and second AF pixels 30, which are used for focus detection and are arranged so as to mutually form a pair on an optical axis target. The CCD 24 is configured so that the first AF pixels 28 and the second AF pixels 30 paired with each other are discretely arranged in a plurality of sets between the plurality of imaging pixels 26. The photoelectric conversion element 59 is divided broadly into a photoelectric conversion element 26A used for the capturing and photoelectric conversion elements 28A and 30A, which are used for the focus detection. The imaging pixel 26 includes the photoelectric conversion element 26A that receives the light for the capturing and outputs the electric signal for the capturing in response to the amount of received light. The first AF pixel 28 includes the photoelectric conversion element 28A that receives the light for focus detection and outputs the electric signal for focusing in response to the amount of received light. The photoelectric conversion element 28A is arranged at one region (in an example illustrated in FIG. 2, a left region in front view) of a pair of horizontal split regions obtained by equally two-splitting the pixel in a horizontal direction on a light receiving surface of the photoelectric conversion element 28A as a predetermined plane. The second AF pixel 30 includes the photoelectric conversion element 30A that receives the light for focus detection and outputs the electric signal for focusing in response to the amount of received light. The photoelectric conversion element 30A is arranged at the other region (in an example illustrated in FIG. 2, a right region in front view) of the pair of horizontal split regions.

Further, a microlens 32 is correspondingly provided in each photoelectric conversion element 59 at an upper portion of each photoelectric conversion element 59 to the object image on the corresponding photoelectric conversion element 59.

Furthermore, although not illustrated in order to avoid confusion in FIG. 2, a color filter layer of a corresponding color and a protective layer are formed between a microlens 64 and the photoelectric conversion element 59.

Meanwhile, as illustrated in FIG. 3, the CCD 24 according to the present embodiment includes a capturing region 70 formed in such a manner that the plurality of photoelectric conversion elements 59 are arranged in a matrix, and the capturing region 70 includes an AF target region 70A (as an example, a rectangular region which has a smaller size than the capturing region 70 and involves the center of the capturing region 70) which is predetermined as a target region for detecting the focal point. Then, a horizontal transfer path 72 is provided in the vicinity of a lower end of a capturing region 70 to receive the electric signal, which is obtained by the photoelectric conversion in each photoelectric conversion element 59 of the capturing region 70, from one line at a time and output the received electric signal to an output amplifier 74. Here, the output amplifier 74 converts a signal charge of each pixel transferred from the horizontal transfer path 72 into a voltage signal.

Furthermore, although not illustrated so as to avoid confusion, a vertical transfer path is provided in the CCD 24 according to the present embodiment to receive the electric signal, which is obtained by the photoelectric conversion in each photoelectric conversion element 59 of the capturing region 70, and to sequentially transfer the received electric signal toward the horizontal transfer path 72, in case of a transfer mode.

In the digital camera 10 having the CCD 24 configured in this manner, either of a contrast AF function (AF function referred as a "hill-climbing AF function") and a phase-difference AF function can be applied as an AF function. The contrast AF function performs an AF control by a so-called contrast control system that generates an AF estimation value (generally, value referred to as a "contrast estimation value") as an estimation value indicating sharpness of the object image by extracting and integrating high-frequency components from luminous information indicated by the digital image data corresponding to the AF target region 70A, based on the digital image data obtained in a state of operating the CCD 24 at a transfer mode, and specifies a position (as an example in the present embodiment, a position of the capturing lens 22A in which the AF estimation value is the maximum value) of the lens in which the AF estimation value is a predetermined value as a value at the time of focusing by moving the lens (as an example, capturing lens 22A illustrated in FIG. 4) provided in the optical unit 22 in the optical axis direction, thereby positioning the lens to the corresponding position. The phase-difference AF function performs the AF control by a so-called phase-difference control system that derives misalignment amount (phase difference) of the object image between the pixels in the AF target region 70A, based on the digital image data obtained in a state of operating the CCD 24 at the transfer mode, and moves the lens to the focusing position based on the derived misalignment amount.

Note that, according to the present embodiment, which AF functions to be applied is set in advance on a menu screen of the digital camera 10, but it is not limited thereto. Needless to say, the digital camera 10 may be configured to include an AF function setting switch, and accordingly, either of the contrast AF function or the phase-difference AF function may be applied using other types, for example, a type for setting by the switch.

Figure 4:
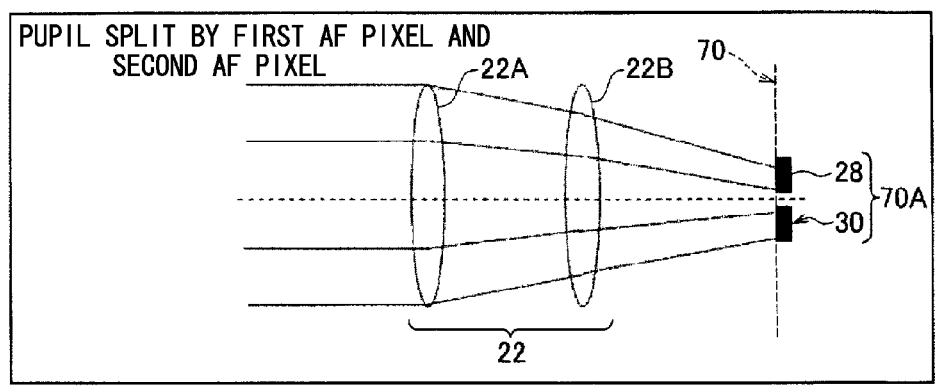
FIG. 4 is a schematic view illustrating an example of a configuration of an optical system unit and a capturing region according to the first embodiment.

In order to implement the phase-difference AF function, the AF target region 70A included in the capturing region 70 of the digital camera 10 according to the present embodiment is configured to include at least the pair of first AF pixel 28 and second AF pixel 30 as well as a plurality of imaging pixels 26, as illustrated in FIG. 4 as an example. Further, as illustrated in FIG. 4 as an example, the optical system unit 22 is configured to include a capturing lens 22A and a separator lens 22B which are sequentially disposed over the capturing region 70 from an incident side of the light. The optical system unit 22 allows one light, which transmits through a pupil region (as an example illustrated in FIG. 4, vicinity of both ends of the capturing lens 22A) different from the capturing lens 22A, to be incident to one of the paired first AF pixel 28 or second AF pixel 30 through the separator lens 22B. Moreover, the optical system unit 22 allows the other light, which transmits through a pupil region different from the capturing lens 22A, to be incident to the other of the paired first AF pixel 28 and second AF pixel 30 through the separator lens 22B.

Next, at the time of capturing, overall operations of the digital camera 10 according to the present embodiment will be simply described.

First, the CCD 24 performs the capturing through the optical unit 22 and sequentially outputs an analog signal for each R (Red), G (Green), and B (Blue) that represent the object image, as the electric signals for capturing corresponding to charges accumulated in the photoelectric conversion element 26A, to each of the imaging pixels 26.

The analog signal processing unit 26 performs an analog signal processing, such as a correlated double sampling processing, on the analog signal input from the CCD 24 and then sequentially output the analog signal to the ADC 28.

The ADC 28 converts the analog signal for each R, G, and B that are input from the analog signal processing unit 26 into R, G, and B signals (digital image data) of a predetermined number of bits, respectively, and sequentially outputs the digital image data to the digital signal processing unit 30. The digital signal processing unit 30 accumulates the digital image data that is sequentially input from the ADC 28 in a line buffer incorporated therein and then directly stores in a predetermined region of the memory 48, temporarily.

The digital image data stored in the predetermined region of the memory 48 is read out by the digital signal processing unit 30 in response to the control of the CPU 40. Then, with the digital image data, a white balance adjustment is performed by applying a digital gain for each R, G, and B, which correspond to a predetermined physical quantity, and gamma processing and sharpness processing are performed to generate digital image data of a predetermined number of bits.

Further, the digital signal processing unit 30 performs a YC signal processing with respect to the generated digital image to generate a brightness signal Y and chroma signals Cr and Cb (hereinafter, referred to as an "YC signal") and stores the generated YC signal in a region which is different from the predetermined region of the memory 48.

Furthermore, the LCD 38 is configured as can be used as a finder to display a moving image (through image) obtained by a continuous capturing through the CCD 24. In case of using the LCD 38 as the finder, the generated YC signal is sequentially output to the LCD 38 through the LCD interface 36. Thus, the through image is displayed on the LCD 38.

Here, in the case in which the release switch is in the half-pressed state by a user, as described above, the AE function is activated and the exposure state is set, and then the AF function is activated and the AF is controlled. Thereafter, subsequently, at a timing when the release switch is in fully pressed state, the YC signal stored in the memory 48 at that point in time are compressed in a predetermined compression format (in the present embodiment, JPEG format) by the compression/expansion processing circuit 54 and then is recorded as an electronic file (an image file) in the memory card 52 through the external memory interface 50, thereby performing the capturing.

Figure 5:
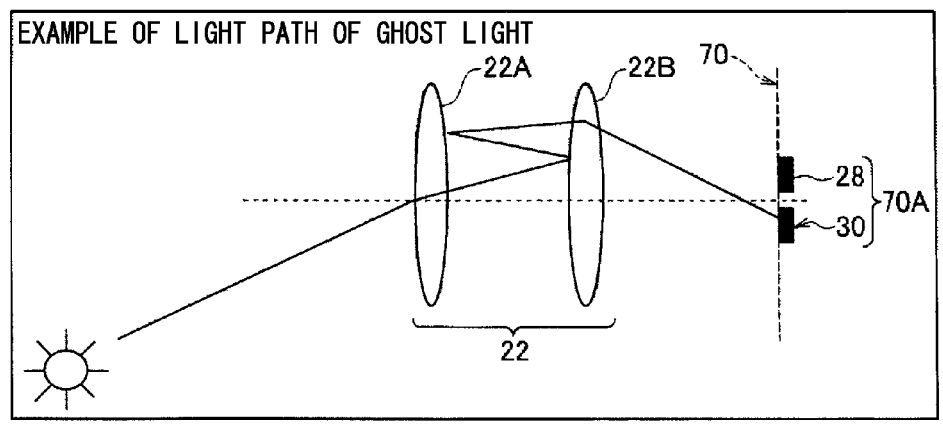
FIG. 5 is a schematic view illustrating an example of a light path of ghost light incident to the optical system unit according to the first embodiment.

However, in case of actuating the above-described phase difference AF as the AF function, as illustrated in FIG. 5 as an example, if light (ghost light) is incident to the paired first AF pixel 28 and second AF pixel 30 included in the AF target region 70A of the capturing region 70 from an angle, which generates, for example, a ghost, unexpected difference occurs between a signal level (signal amount) of the electric signal output from the first AF pixel 28 and a signal level (signal amount) of the electric signal output from the second AF pixel 30, thereby decreasing accuracy in the focus detection.

Therefore, in the digital camera 10 according to the present embodiment, an AF processing to be indicated below is performed to suppress the decrease of the accuracy in the focus detection.

Figure 6:
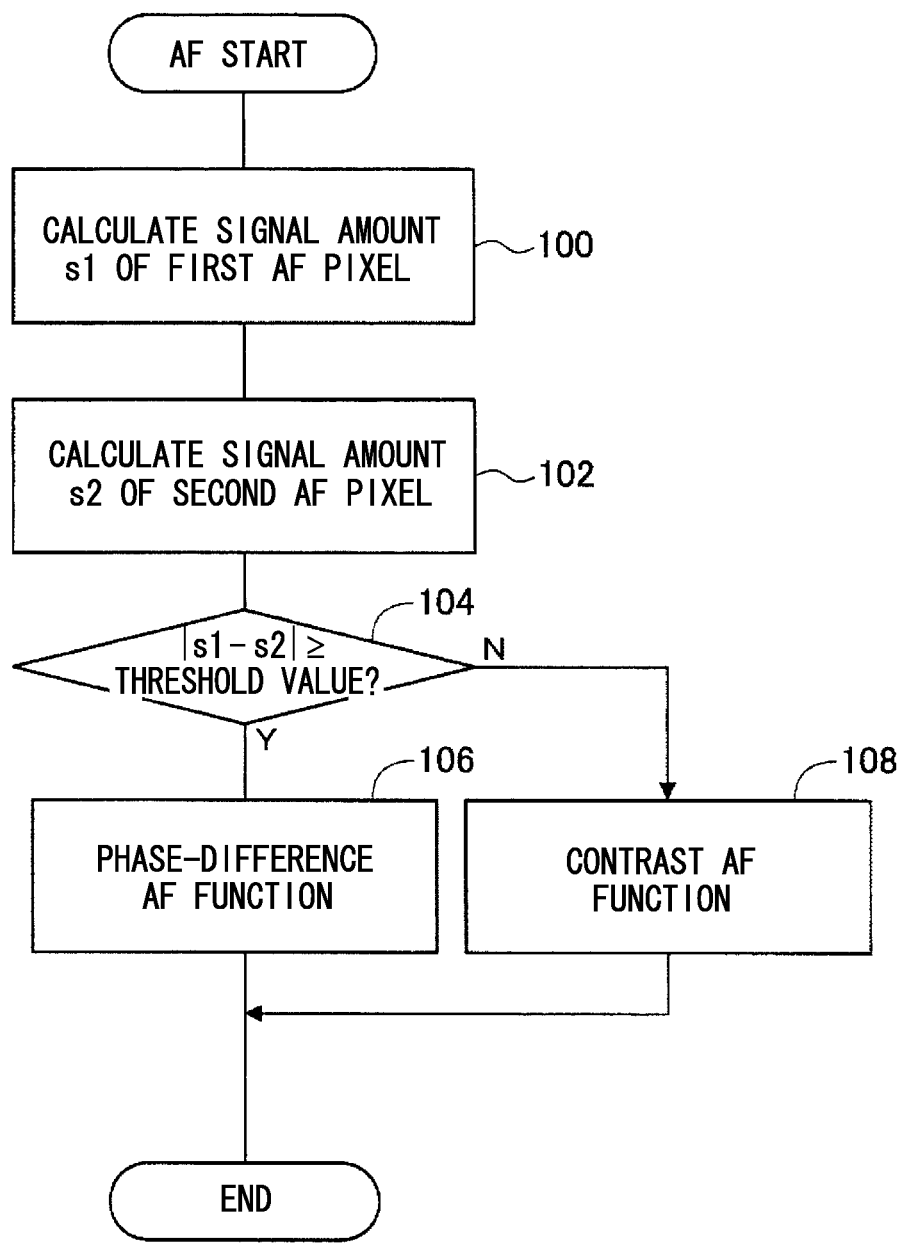
FIG. 6 is a flowchart illustrating an example a process flow of an AF processing program according to the first embodiment.

FIG. 6 is a flowchart illustrating an example of a process flow of an AF processing program executed by the CPU 40 of the digital camera 10 in the case in which the release switch is in the half-pressed state by the user. The AF processing according to the present embodiment will be described below with reference to FIG. 6. Furthermore, in order to confusion, a case of activating the phase-difference AF function using the pair of a first AF pixel 28 and a second AF pixel 30 included in the AF target region 70A will be described.

First, in step 100, a signal amount s1 of the electric signal output from the photoelectric conversion element 28A of the first AF pixel 28 is calculated, and then a signal amount s2 of the electric signal output from the photoelectric conversion element 30A of the second AF pixel 30 is calculated in step 102.

In next step 104, it is determined whether an absolute value of difference between the signal amount s1 calculated by the process of the step 100 and the signal amount s2 calculated by the process of the step 102 is equal to or more than a predetermined threshold value. At this time, the process proceeds to step 106 in the case of the determination is negative, on the other hand, the process proceeds to step 108 in the case of the determination is affirmative. Furthermore, for example, as "the predetermined threshold value" used in the process of the step 104, a value obtained on the basis of the signal amount of the electric signal acquired by the imaging pixel 26 which is provided in the vicinity of the paired first AF pixel 28 and second AF pixel 30 (as an example, the first AF pixel 28 served in the process of the step 100 and the second AF pixel 30 served in the process of the step 100) within the same AF target region 70A may be used. For example, as "the predetermined threshold value", a test result (an actual measurement value) obtained as a value to be determined not to be focused by a test using the actual digital camera 10 or a simulation result (an estimated value) obtained as a value to be determined not to be focused by a computer simulation may be used. In this case, a predetermined value as a value, by which the image having high sharpness can be obtained, in operating the contrast AF function than in operating the phase-difference AF function may be used.

In step 106, the phase-difference AF function is activated by movement of the capturing lens 22A to the position which is specified by the computation result, which is obtained by a correlation computation based on the signal amount s1 calculated by the process of the step 100 and the signal amount s2 calculated by the process of the step 102, and then the AF processing program ends.

In step 108, the contrast AF function is activated using the digital image data obtained by the imaging pixel 26, which is included in the AF target region 70A, at the present moment, and then the AF processing program ends.

As described in detail above, the digital camera 10 according to the present embodiment includes: the photoelectric conversion element 26A as the capturing photoelectric conversion element that receives the light transmitted through the capturing lens 22A, which is movable in the optical axis direction, and photoelectrically converts the received light into the capturing electric signal; the first AF pixel 28 and the second AF pixel 30 as a pair of focusing photoelectric conversion elements that receives a pair of split light obtained by a pupil split of the light incident to the capturing lens 22A and photoelectrically converts the received light into the focusing electric signal; the motor driving unit 34 as a movement unit that moves the capturing lens 22A in the optical axis direction; and the CPU 40 that, in the case in which the signal amount between the electric signals obtained by the first AF pixel 28 and the second AF pixel 30 exceeds a predetermined degree of coincidence (as an example in the present embodiment, in the case in which the absolute value of the difference is less than the predetermined threshold value), controls the motor driving unit 34 so as to move the capturing lens 22A to the focusing position based on such signal amount and that, in the case in which the signal amount is the predetermined degree of coincidence or less (as an example in the present embodiment, in the case in which the absolute value of the difference is equal to or more than the predetermined threshold value), controls the motor driving unit 34 so as to move the capturing lens 22A to the position on the optical axis, in which the AF evaluation value as an evaluation value for evaluating the sharpness of the object image to be generated based on the electric signal obtained by the photoelectric conversion element 26A becomes the evaluation value (in the first embodiment, the maximum value) at the time of focusing. With these configurations, the digital camera 10 according to the present embodiment can suppress the decrease of the accuracy in the focus detection.

[Second Embodiment]

In the first embodiment, examples of the case of activating the phase-difference AF function using the signal level of the electric signal between the different pixels are described, but a case of acquiring a plurality of electric signals from each of split pixels obtained by splitting a single pixel and activating the phase-difference AF function using the electric signals will be described in the second embodiment. Furthermore, a configuration of the digital camera 10 according to the present embodiment is the same as that the first embodiment except for the configuration of the photoelectric conversion element of the CCD 24. Therefore, differences from the first embodiment will be described below.

Figure 7:
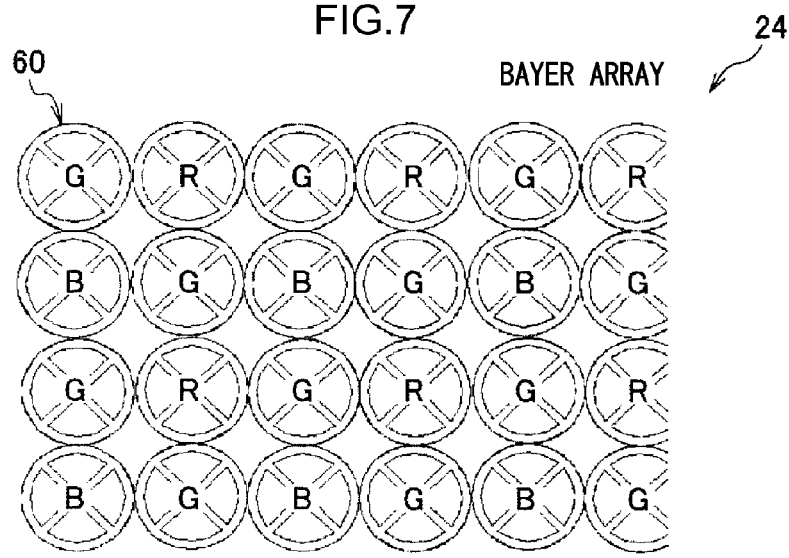
FIG. 7 is a schematic view illustrating a pixel array of the CCD according to a second embodiment.

FIG. 7 is a schematic view illustrating a pixel array of the CCD 24 according to the present embodiment. As illustrated in FIG. 7, the pixel array of the CCD 24 according to the second embodiment is a Bayer array and is configured such that a pixel G is arranged in two pixels on one diagonal line of a square array of two×two pixels and pixel R and pixel B are arranged in two pixels on the other diagonal line thereof.

However, the digital camera 10 according to the present embodiment is configured to detect the phase difference in two directions of the horizontal direction and the vertical direction. That is, the optical unit 22 is configured to perform the pupil split on the light incident to the capturing lens 22A, in each of the horizontal direction and the vertical direction. In the present embodiment, therefore, instead of employing the photoelectric conversion elements 28A and 30A according to the first embodiment, a photoelectric conversion element 60 is employed to detect two pairs of split light which are obtained by performing the pupil split in each direction of the horizontal direction and the vertical direction. Furthermore, in the CCD 24 according to the present embodiment, the photoelectric conversion element 60 is arranged at the position of the photoelectric conversion element 28A of the CCD 24 according to the first embodiment, and the above-described photoelectric conversion element 60 is arranged at the position of the photoelectric conversion element 30A.

Figure 8:
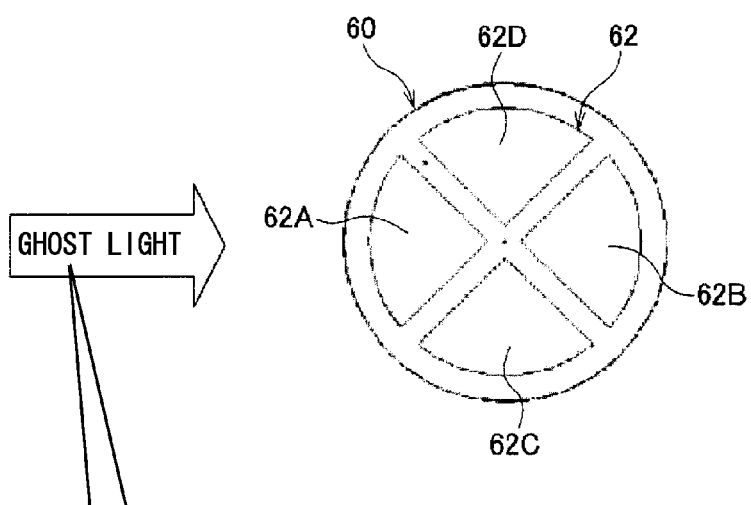
FIG. 8 is a schematic view illustrating an example of a structure of a photoelectric conversion element for focus detection according to the second embodiment.

FIG. 8 is a schematic view illustrating an example of a structure of the photoelectric conversion element 60 according to the present embodiment. As illustrated in FIG. 8, a photoelectric conversion unit 62 of the photoelectric conversion element 60 is substantially equally split in each direction of the horizontal direction and the vertical direction and is configured by a first split photoelectric conversion unit 62A and a second split photoelectric conversion unit 62B which are arranged in the horizontal direction and a third split photoelectric conversion unit 62C and a fourth split photoelectric conversion unit 62D which are arranged in the vertical direction. That is, the photoelectric conversion unit 62 is split into four regions in units of pixels. In the pixel, the pixel is split such that a horizontal split regions aligned in the horizontal direction on the light receiving surface of the photoelectric conversion unit 62 as the above-described predetermined plane and a pair of vertical split regions aligned in the vertical direction (as an example, vertical direction in case of placing the CCD 24 at a predetermined angle on the horizontal plane) are formed. Moreover, the first split photoelectric conversion unit 62A and the second split photoelectric conversion unit 62B are arranged to correspond with a pair of horizontal split regions obtained by splitting the pixel, and the third split photoelectric conversion unit 62C and the fourth split photoelectric conversion unit 62D are arranged to correspond with a pair of vertical split regions obtained by splitting the pixel.

Further, the optical unit 22 according to the present embodiment is configured such that a pair of split light, which are obtained by performing the pupil split in the horizontal direction, are guided to the first split photoelectric conversion unit 62A and the second split photoelectric conversion unit 62B and that a pair of split light, which are obtained by performing the pupil split in the vertical direction, are guided to the third split photoelectric conversion unit 62C and the fourth split photoelectric conversion unit 62D. Accordingly, one split light of a pair of split light obtained by performing the pupil split on the light incident to the capturing lens 22A in the horizontal direction is correspondingly incident to one of the first split photoelectric conversion unit 62A or the second split photoelectric conversion unit 62B, and the other split light of a pair of split lights obtained by performing the pupil split on the light incident to the capturing lens 22A is correspondingly incident to the other of the first split photoelectric conversion unit 62A and the second split photoelectric conversion unit 62B. Further, one split light of a pair of split light obtained by performing the pupil split on the light incident to the capturing lens 22A in the vertical direction is correspondingly incident to one of the third split photoelectric conversion unit 62C or the fourth split photoelectric conversion unit 62D, and the other split light of a pair of split lights obtained by performing the pupil split on the light incident to the capturing lens 22A in the vertical direction is correspondingly incident to the other of the third split photoelectric conversion unit 62C and the fourth split photoelectric conversion unit 62D. For this reason, in the digital camera 10 according to the present embodiment, it is possible to detect the phase difference which makes available for the phase-difference AF function in units of pixels in each direction of the horizontal direction and the vertical direction.

However, as an example, as illustrated in FIG. 8, if the ghost light is incident to the photoelectric conversion element 60 from the horizontal direction, the absolute value of the difference between the signal amount of the electric signal output from the first split photoelectric conversion unit 62A and the signal amount of the electric signal output from the second split photoelectric conversion unit 62B is increased as compared with the case where the ghost light of the same light quantity is incident from the other direction. However, the influence of the ghost light incident to the photoelectric conversion element 60 from the horizontal direction on the absolute value of the difference between the signal amount of the electric signal output from the third split photoelectric conversion unit 62C and the signal amount of the electric signal output from the fourth split photoelectric conversion unit 62D is small as compared with that of the ghost light incident to the photoelectric conversion element 60 from the horizontal direction on the absolute value of the difference between the signal amount of the electric signal output from the first split photoelectric conversion unit 62A and the signal amount of the electric signal output from the second split photoelectric conversion unit 62B.

Further, if the ghost light is incident to the photoelectric conversion element 60 from the vertical direction, the absolute value of the difference between the signal amount of the electric signal output from the third split photoelectric conversion unit 62C and the signal amount of the electric signal output from the fourth split photoelectric conversion unit 62D is increased as compared with the case where the ghost light of the same light quantity is incident from the other direction. However, the influence of the ghost light incident to the photoelectric conversion element 60 from the vertical direction on the absolute value of the difference between the signal amount of the electric signal output from the first split photoelectric conversion unit 62A and the signal amount of the electric signal output from the second split photoelectric conversion unit 62B is small as compared with that of the ghost light incident to the photoelectric conversion element 60 from the vertical direction on the absolute value of the difference between the signal amount of the electric signal output from the third split photoelectric conversion unit 62C and the signal amount of the electric signal output from the fourth split photoelectric conversion unit 62D.

Accordingly, the digital camera 10 according to the present embodiment executes the AF processing for activating the phase difference function based on one of the absolute value of the difference between the signal amount of the electric signal output from the first split photoelectric conversion unit 62A and the signal amount of the electric signal output from the second split photoelectric conversion unit 62B or the absolute value of the difference between the signal amount of the electric signal output from the third split photoelectric conversion unit 62C and the signal amount of the electric signal output from the fourth split photoelectric conversion unit 62D, which is less influenced by the ghost light.

Figure 9:
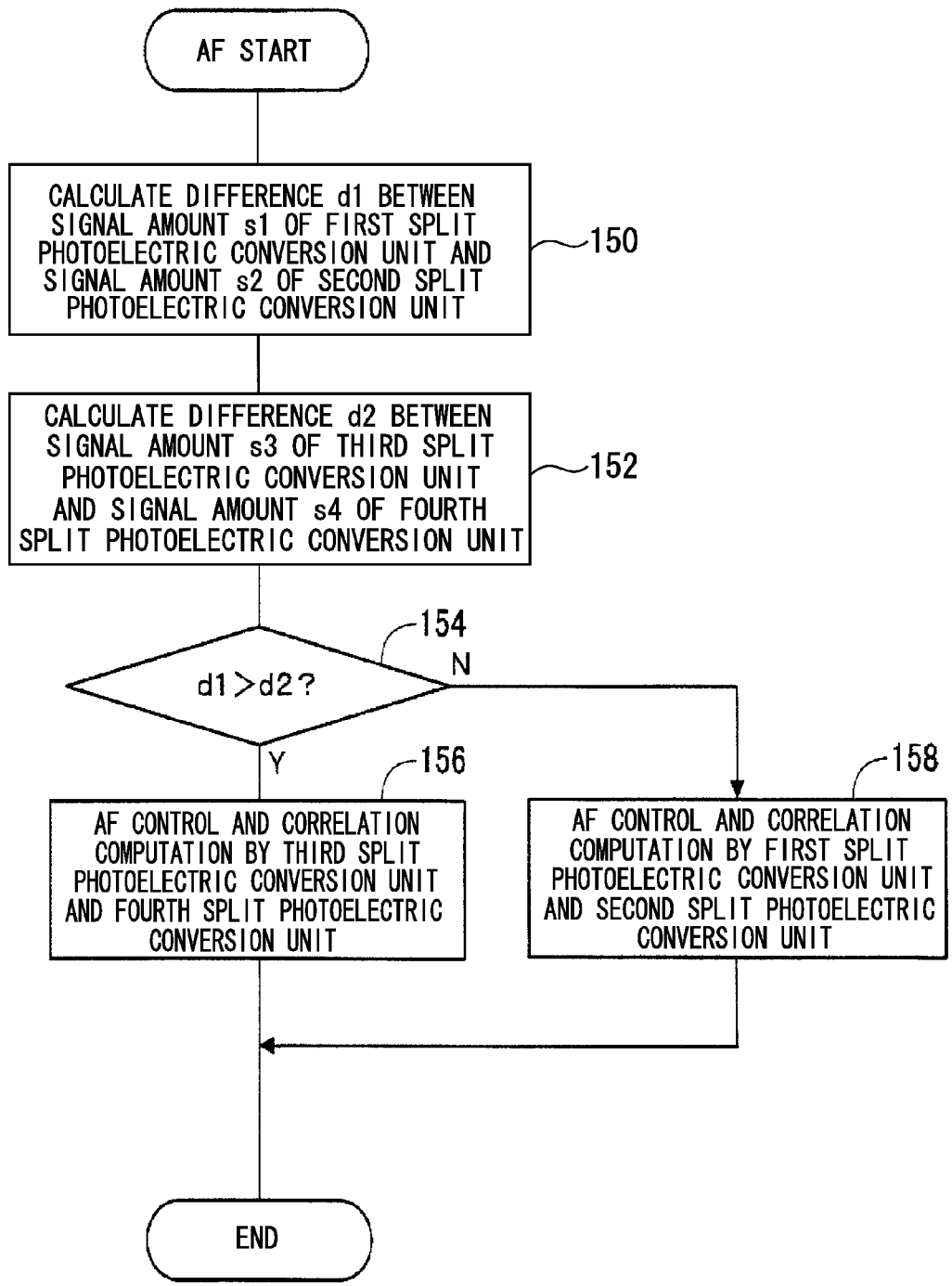
FIG. 9 is a flowchart illustrating an example a process flow of an AF processing program according to the second embodiment.

FIG. 9 is a flowchart illustrating an example a process flow of an AF processing program according to the present embodiment to be executed by the CPU 40 of the digital camera 10, in the case in which the release switch is in the half-pressed state by the user. Hereinafter, an AF processing according to the present embodiment will be described with reference to FIG. 9.

First, in step 150, a signal amount s1 of the electric signal output from the first split photoelectric conversion unit 62A is calculated, a signal amount s2 of the electric signal output from the second split photoelectric conversion unit 62B is calculated, and thus an absolute value d1 of the difference between the signal amount s1 and the signal amount s2 is calculated.

In next step 152, a signal amount s3 of the electric signal output from the third split photoelectric conversion unit 62C is calculated, a signal amount s4 of the electric signal output from the fourth split photoelectric conversion unit 62D is calculated, and thus an absolute value d2 of the difference between the signal amount s3 and the signal amount s4 is calculated.

In step 154, it is determined whether the absolute value d1 of the difference calculated by the process of the step 150 is greater than the absolute value d2 of the difference calculated by the process of the step 152. At this time, if the determination is negative, the process proceeds to step 156; on the other hand, if the determination is affirmative, the process proceeds to step 158.

In step 156, the phase-difference AF function is activated as the AF control by movement of the capturing lens 22A to the position which is specified by the computation result, which is obtained by a correlation computation based on the signal amount (as an example, signal amount s3 calculated by the process of the step 152) of the electric signal output from the third split photoelectric conversion unit 62C and the signal amount (as an example, signal amount s4 calculated by the process of the step 152) of the electric signal output from the fourth split photoelectric conversion unit 62D, and then the AF processing program ends.

In step 158, the phase-difference AF function is activated as a focusing control by movement of the capturing lens 22A to the position which is specified by the computation result, which is obtained by the correlation computation based on the signal amount (as an example, signal amount s1 calculated by the process of the step 150) of the electric signal output from the first split photoelectric conversion unit 62A and the signal amount (as an example, signal amount s2 calculated by the process of the step 150) of the electric signal output from the second split photoelectric conversion unit 62B, and then the AF processing program ends.

As described in detail above, the digital camera 10 according to the present embodiment includes: the capturing lens 22A which is movable in the optical axis direction; the photoelectric conversion element 26A as an imaging element in which the first split photoelectric conversion unit 62A and the second split photoelectric conversion unit 62B as a pair of horizontal light receiving units, which are aligned in the horizontal direction, configured to receive the pair of split light of the horizontal direction obtained by performing the pupil split on the light incident to the capturing lens 22A in the horizontal direction, and the third split photoelectric conversion unit 62C and the fourth split photoelectric conversion unit 62D as a pair of vertical light receiving units, which are in the vertical direction, configured to receive the pair of split light of the vertical direction obtained by performing the pupil split on the light incident to the capturing lens 22A in the vertical direction are two-dimensionally arranged; the motor driving unit 34 as a movement unit that moves the capturing lens 22A in the optical axis direction; the CPU 40 as a specifying unit that specifies a greater one (as an example in the present embodiment, a smaller one of the absolute value of the signal amount difference between the electric signals obtained by the first split photoelectric conversion unit 62A and the second split photoelectric conversion unit 62B or the absolute value of the signal amount difference between the electric signals obtained by the third split photoelectric conversion unit 62C and the fourth split photoelectric conversion unit 62D) of the degree of signal amount coincidence between the electric signals obtained by the first split photoelectric conversion unit 62A and the second split photoelectric conversion unit 62B and the degree of signal amount coincidence between the electric signals obtained by the third split photoelectric conversion unit 62C and the fourth split photoelectric conversion unit 62D; and the CPU 40 that controls the motor driving unit 34 so as to move the capturing lens 22A to the focusing position based on the signal amount corresponding to the greater degree of coincidence as specified. With these configurations, the digital camera 10 according to the present embodiment can suppress the decrease of the accuracy in the focus detection.

Further, since the digital camera 10 according to the present embodiment employs the photoelectric conversion element 60 without employing the photoelectric conversion elements 28A and 30A according to the first embodiment, it is possible to achieve miniaturization as compared with the digital camera 10 according to the first embodiment.

[Third Embodiment]

In the second embodiment, examples of the case of applying the phase-difference AF function as the AF function are described, but a case of selectively applying the phase-difference AF function and the contrast AF function will be described in a third embodiment. Furthermore, a configuration of the digital camera 10 according to the present embodiment is the same as that the second embodiment. Therefore, differences from the second embodiment will be described below. Further, if there is no need to distinguish between the first split photoelectric conversion unit 62A, the second split photoelectric conversion unit 62B, the third split photoelectric conversion unit 62C, and the fourth split photoelectric conversion unit 62D described above in following description, these are referred to as a "split photoelectric conversion unit".

Figure 10:
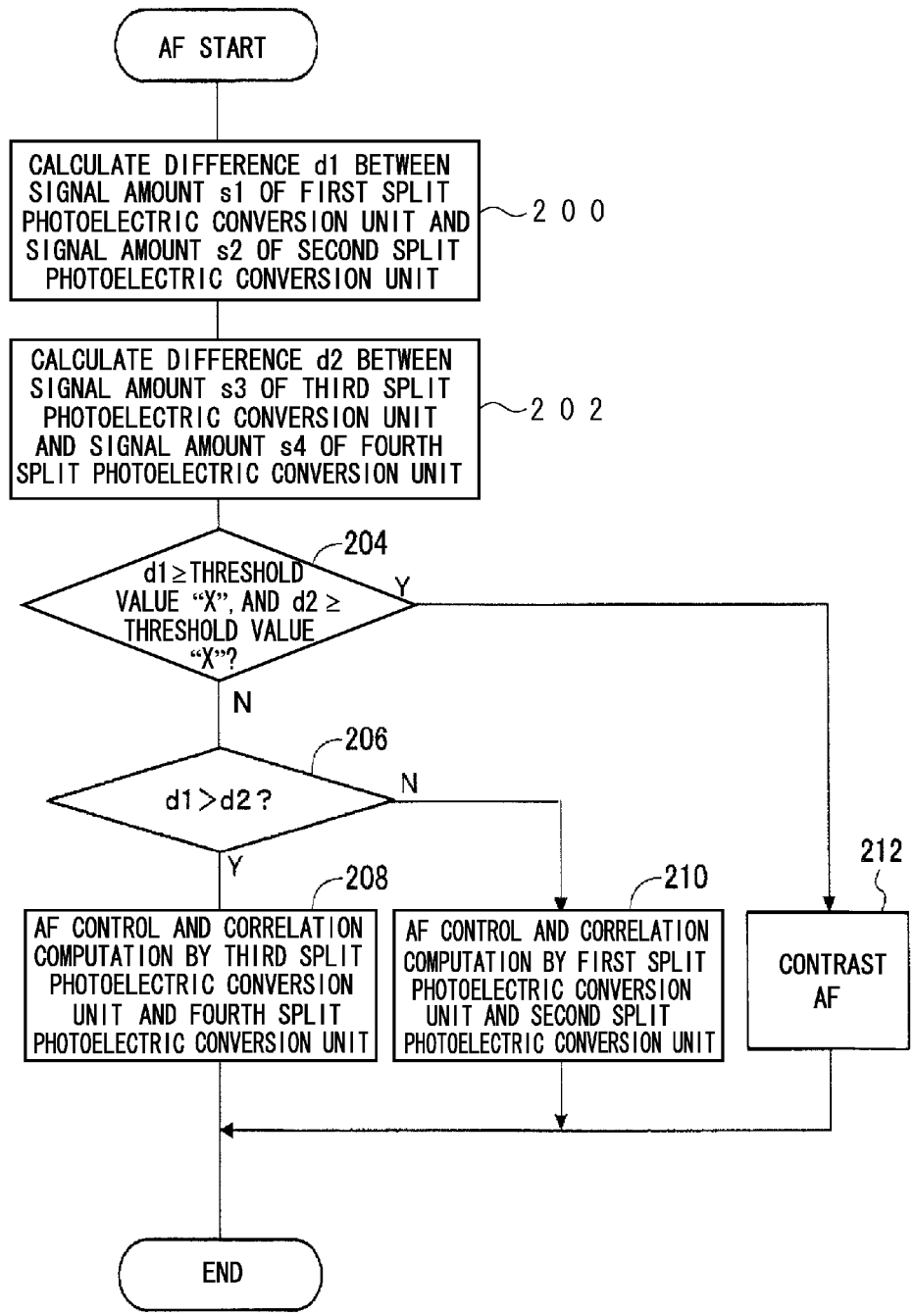
FIG. 10 is a flowchart illustrating an example a process flow of an AF processing program according to a third embodiment.

FIG. 10 is a flowchart illustrating an example a process flow of an AF processing program according to the present embodiment to be executed by the CPU 40 of the digital camera 10, in the case in which the release switch is in the half-pressed state by the user. Hereinafter, an AF processing according to the present embodiment will be described with reference to FIG. 10.

First, in step 200, a signal amount s1 of the electric signal output from the first split photoelectric conversion unit 62A is calculated, a signal amount s2 of the electric signal output from the second split photoelectric conversion unit 62B is calculated, and thus an absolute value d1 of the difference between the signal amount s1 and the signal amount s2 is calculated.

In next step 202, a signal amount s3 of the electric signal output from the third split photoelectric conversion unit 62C is calculated, a signal amount s4 of the electric signal output from the fourth split photoelectric conversion unit 62D is calculated, and thus an absolute value d2 of the difference between the signal amount s3 and the signal amount s4 is calculated.

In step 204, it is determined whether the absolute value d1 of the difference calculated by the process of the step 200 is equal to or more than the predetermined threshold value (hereinafter, referred to as "threshold value X"), which is described in the first embodiment, and whether the absolute value d2 of the difference calculated by the process of the step 202 is equal to or more than the threshold value "X". At this time, if the determination is negative, the process proceeds to step 206.

In step 206, it is determined whether the absolute value d1 of the difference calculated by the process of the step 200 is greater than the absolute value d2 of the difference calculated by the process of the step 202. At this time, if the determination is affirmative, the process proceeds to step 208; on the other hand, if the determination is negative, the process proceeds to step 210.

In step 208, the phase-difference AF function is activated as the AF control by performing the correlation computation based on the signal amount (as an example, signal amount s3 calculated by the process of the step 202) of the electric signal output from the third split photoelectric conversion unit 62C and the signal amount (as an example, signal amount s4 calculated by the process of the step 202) of the electric signal output from the fourth split photoelectric conversion unit 62D, and then the AF processing program ends.

In step 210, the phase-difference AF function is activated as the AF control by movement of the capturing lens 22A to the position which is specified by the computation result obtained by the correlation computation based on the signal amount (as an example, signal amount s1 calculated by the process of the step 200) of the electric signal output from the first split photoelectric conversion unit 62A and the signal amount (as an example, signal amount s2 calculated by the process of the step 200) of the electric signal output from the second split photoelectric conversion unit 62B, and then the AF processing program ends.

Meanwhile, if the determination is affirmative in step 204, the process proceeds to step 212 and the contrast AF function is activated as the AF control using the digital image data obtained by the imaging pixel 26, which is included in the AF target region 70A (as an example, the AF target region 70A equal to the photoelectric conversion element 60 served in the process of the steps 200 and 202), at the present moment, and then the AF processing program ends.

Figure 11A:
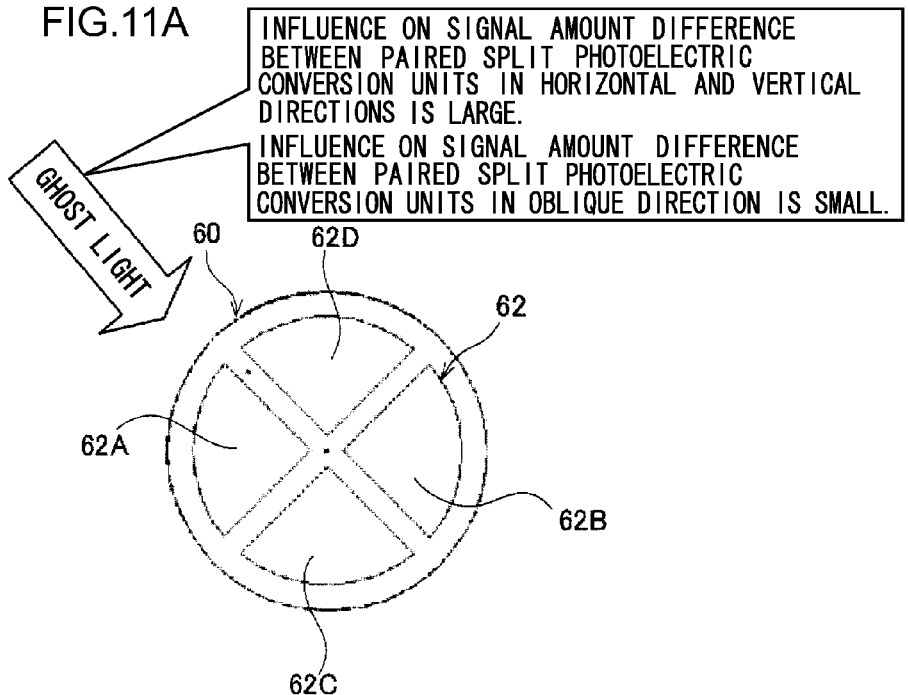
FIG. 11A is an explanatory view illustrating an example of a processing in the case in which the ghost light is incident on a photoelectric conversion element according to the third embodiment from an oblique direction and illustrates an example of the light path of the ghost light incident on the optical system unit.
Figure 11B:
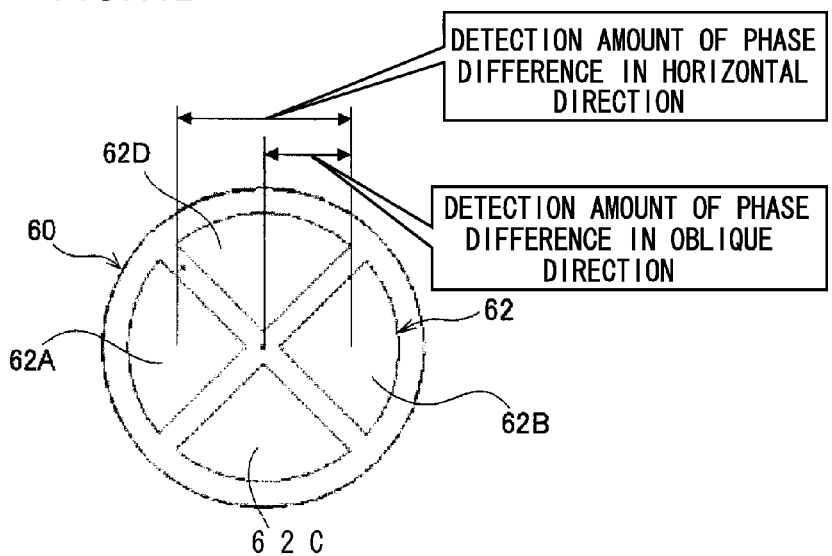
FIG. 11B is an explanatory view illustrating the example of the processing in the case in which the ghost light is incident on the photoelectric conversion element according to the third embodiment from the oblique direction and illustrates an example of a pair of split photoelectric conversion units which are different from each other in a detection amount of a phase difference.

As illustrated in FIG. 11A as an example, if the ghost light enters the photoelectric conversion element 60 from the direction (an example, an arrow direction illustrated in FIG. 8), which forms angle of approximate 45 degrees on the light receiving surface of the photoelectric conversion unit 62, with respect to the horizontal direction which is an array direction of the first split photoelectric conversion unit 62A and the second split photoelectric conversion unit 62B, the influence of the ghost light on the absolute value of the difference between the signal amount of the electric signal output from the first split photoelectric conversion unit 62A and the signal amount of the electric signal output from the second split photoelectric conversion unit 62B and the absolute value of the difference between the signal amount of the electric signal output from the third split photoelectric conversion unit 62C and the signal amount of the electric signal output from the fourth split photoelectric conversion unit 62D is larger than the influence of the ghost light on the absolute value of the difference between the signal amount of the electric signal output from the first split photoelectric conversion unit 62A and the signal amount of the electric signal output from the third split photoelectric conversion unit 62C and the absolute value of the difference between the signal amount of the electric signal output from the second split photoelectric conversion unit 62B and the signal amount of the electric signal output from the fourth split photoelectric conversion unit 62D. That is, as illustrated in FIG. 11B, an detection amount of the phase difference between the first split photoelectric conversion unit 62A and the second split photoelectric conversion unit 62B is about half of the detection amount of the phase difference between the second split photoelectric conversion unit 62B and the fourth split photoelectric conversion unit 62D (alternatively, the detection amount of the phase difference between the first split photoelectric conversion unit 62A and the third split photoelectric conversion unit 62C.

Therefore, in the case in which both of the absolute value of the difference between the signal amount of the electric signal output from the first split photoelectric conversion unit 62A and the signal amount of the electric signal output from the second split photoelectric conversion unit 62B and the absolute value of the difference between the signal amount of the electric signal output from the third split photoelectric conversion unit 62C and the signal amount of the electric signal output from the fourth split photoelectric conversion unit 62D is equal to or more than a threshold value "Y" (a predetermined threshold value as it can be considered that that the ghost light is incident to the photoelectric conversion element 60 from the direction (the arrow direction illustrated in FIG. 8) which forms the angle of approximate 45 degrees on the light receiving surface of the photoelectric conversion unit 62) of less than the threshold value "X", if the determination is affirmative in the step 204, instead of the processes of the steps 206 to 210, the phase-difference AF function may be activated by the movement of the capturing lens 22A to the position specified by the computation result, which is obtained by the correlation computation based on the signal amount of the electric signal output from the first split photoelectric conversion unit 62A and the signal amount of the electric signal output from the third split photoelectric conversion unit 62C (signal amount of the electric signal output from the paired split photoelectric conversion unit in a specified oblique direction in the pixel), or the phase-difference AF function may be activated by the movement of the capturing lens 22A to the position specified by the computation result, which is obtained by the correlation computation based on the signal amount of the electric signal output from the second split photoelectric conversion unit 62B and the signal amount of the electric signal output from the fourth split photoelectric conversion unit 62D. Accordingly, in the case in which the ghost light enters the photoelectric conversion element 60 from at least the arrow direction illustrated in FIG. 11A, it can suppress the decrease of the accuracy in the focus detection as compared with the case of performing the processes of the steps 206 to 210.

Furthermore, even though it is also considered that the ghost light enters the photoelectric conversion unit 60 from an oblique direction (here, "oblique direction" indicates a direction other than the horizontal direction and the vertical direction) other than the arrow direction illustrated in FIG. 11A, any angle from which the ghost light enters may be specified from the difference between each of the absolute value of the difference between the signal amount of the electric signal output from the first split photoelectric conversion unit 62A and the signal amount of the electric signal output from the second split photoelectric conversion unit 62B and the absolute value of the difference between the signal amount of the electric signal output from the third split photoelectric conversion unit 62C and the signal amount of the electric signal output from the fourth split photoelectric conversion unit 62D and the threshold value "Y", and then it is enough to determine by which pair in oblique direction among the first split photoelectric conversion unit 62A, the second split photoelectric conversion unit 62B, the third split photoelectric conversion unit 62C, and the fourth split photoelectric conversion unit 62D (in other words, a pair of split photoelectric conversion units adjacent to each other in a circumferential direction of the pixel) detects the phase difference in accordance with the incident angle. In this case, for example, it is enough to previously construct a database in a predetermined storage region of the memory 48. The database is configured such that information indicating a pair of photoelectric conversion units in a predetermined oblique direction, which is lowest influenced by the ghost light, among the first split photoelectric conversion unit 62A, the second split photoelectric conversion unit 62B, the third split photoelectric conversion unit 62C, and the fourth split photoelectric conversion unit 62D is uniquely associated with the difference between each of the absolute value of the difference between the signal amount of the electric signal output from the first split photoelectric conversion unit 62A and the signal amount of the electric signal output from the second split photoelectric conversion unit 62B and the absolute value of the difference between the signal amount of the electric signal output from the third split photoelectric conversion unit 62C and the signal amount of the electric signal output from the fourth split photoelectric conversion unit 62D and the threshold value "Y". For this reason, the CPU 40 can derive information indicating a pair of photoelectric conversion units in the oblique direction, which are selected from the first split photoelectric conversion unit 62A, the second split photoelectric conversion unit 62B, the third split photoelectric conversion unit 62C, and the fourth split photoelectric conversion unit 62D by referring the database of the memory 48 from the difference between each of the absolute value of the difference between the signal amount of the electric signal output from the first split photoelectric conversion unit 62A and the signal amount of the electric signal output from the second split photoelectric conversion unit 62B and the absolute value of the difference between the signal amount of the electric signal output from the third split photoelectric conversion unit 62C and the signal amount of the electric signal output from the fourth split photoelectric conversion unit 62D and the threshold value "Y".

Further, the present embodiment illustrates an example of a case of reflecting the calculation result obtained by the process of the step 200 to the phase difference AF function of the step 210 and reflecting the calculation result obtained by the process of the step 202 to the phase difference AF function of the step 208, but may activate the phase difference AF function using an average value of the calculation result obtained by the process of the step 200 and the calculation result obtained by the process of the step 202. Thus, it is possible to further improve the accuracy of the phase difference AF function. Furthermore, the "average value" is only an example and is not intended to be limited to the average value of the absolute value of the difference according to the vertical direction and the absolute value of the difference according to the horizontal direction. Accordingly, the average value may be an average value of the signal amount between the electric signals obtained by the paired photoelectric conversion units in the horizontal direction and the signal amount between the electric signals obtained by the paired photoelectric conversion units in the vertical direction.

As described in detail above, the digital camera 10 according to the present embodiment includes the CPU 40 that specifies a greater one (as an example in the present embodiment, a smaller one of the absolute value of the signal amount difference between the electric signals obtained by the first split photoelectric conversion unit 62A and the second split photoelectric conversion unit 62B or the absolute value of the signal amount difference between the electric signals obtained by the third split photoelectric conversion unit 62C and the fourth split photoelectric conversion unit 62D) of the degree of signal amount coincidence between the electric signals obtained by the first split photoelectric conversion unit 62A and the second split photoelectric conversion unit 62B and the degree of signal amount coincidence between the electric signals obtained by the third split photoelectric conversion unit 62C and the fourth split photoelectric conversion unit 62D; controls the motor driving unit 34 so as to move the capturing lens 22A to the focusing position based on the signal amount corresponding to the specified degree of coincidence, if the specified degree of coincidence exceeds a predetermined degree of coincidence (as an example in the present embodiment, in the case in which the absolute value of the difference is less than the predetermined threshold value); specifies the position on the optical axis of the capturing lens 22A such that the evaluation value for evaluating the sharpness of the object image to be generated based on the electric signal obtained by the photoelectric conversion element 26A of the imaging pixel 26 becomes a predetermined evaluation value (in the first embodiment, the maximum value) as an evaluation value at the time of focusing, if the specified degree of coincidence is the predetermined degree of coincidence or less (as an example in the present embodiment, in the case in which the absolute value of the difference is equal to or more than the predetermined threshold value); and controls the motor driving unit 34 so as to move the capturing lens 22A to the specified position. Thus, the digital camera 10 can suppress the decrease in the accuracy of the focus detection.

Further, since the digital camera 10 according to the present embodiment employs the photoelectric conversion element 60 instead of employing the photoelectric conversion elements 28A and 30A according to the first embodiment, it is possible to achieve miniaturization as compared with the digital camera 10 according to the first embodiment.

[Fourth Embodiment]

In the first embodiment, examples of the case in which the single AF target region 70A is the target region of the focus detection are described, but a case of splitting the AF target region 70A into a plurality of regions will be described in a fourth embodiment. Furthermore, a configuration of the digital camera 10 according to the present embodiment is the same as that the first embodiment. Therefore, differences from the first embodiment will be described below.

Figure 12A:
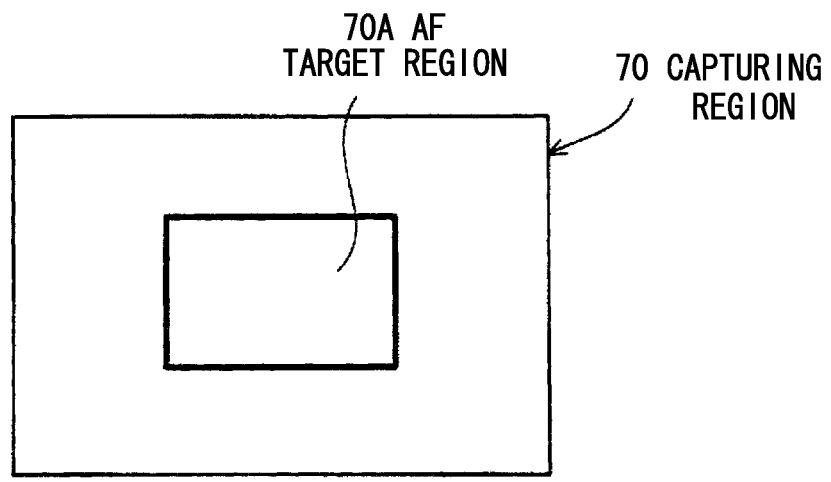
FIG. 12A is a schematic view, which explains an example of a configuration of an AF target region according to a fourth embodiment, and illustrates an example a configuration of an AF target region according to the first embodiment.
Figure 12B:
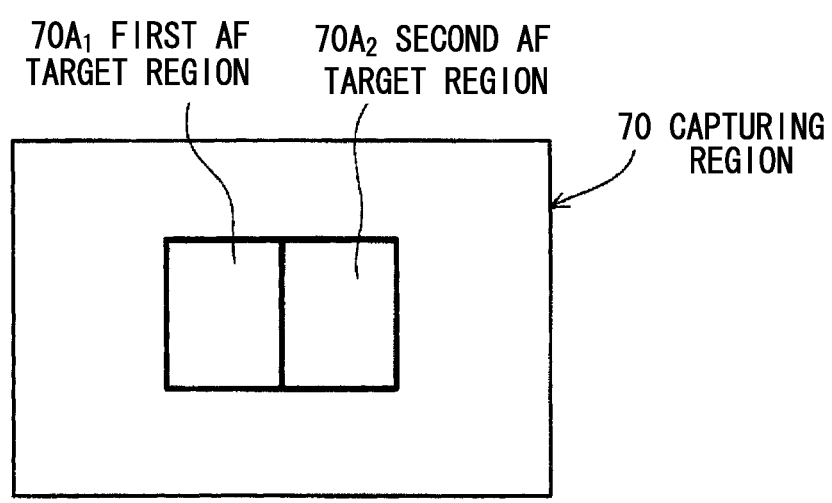
FIG. 12B is a schematic view, which explains the example of the configuration of the AF target region according to the fourth embodiment, and illustrates an example a configuration of the AF target region according to the fourth embodiment.

FIG. 12 is a schematic view illustrating an example of a capturing region 70 according to the present embodiment. As illustrated in FIG. 12B as an example, the capturing region 70 according to the present embodiment includes a first AF target region 70A$_1$ and a second AF target region 70A$_2$ which are formed by equally two-splitting the AF target region 70A (see FIG. 12A) according to the first embodiment in the horizontal direction. Each of the first AF target region 70A$_1$ and the second AF target region 70A$_2$ includes at least a pair of first AF pixel 28 and second AF pixel 30.

In the digital camera 10 according to the present embodiment having the capturing region 70 configured in this manner, the AF processing is executed on each of first AF target region 70A$_1$ and the second AF target region 70A$_2$ as a focus-detection target region.

Figure 13:
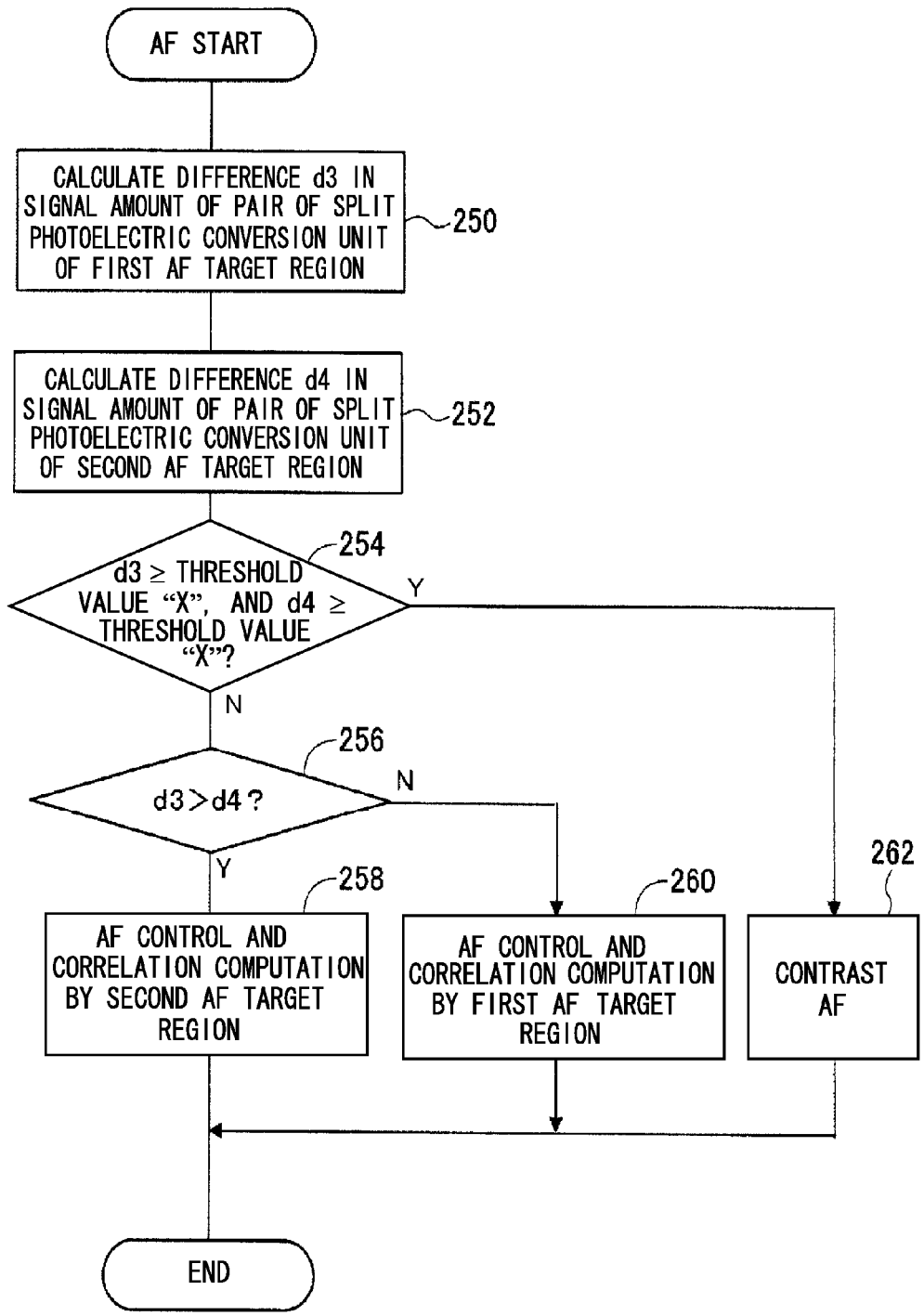
FIG. 13 is a flowchart illustrating an example of a process flow of an AF processing program according to the fourth embodiment.

FIG. 13 is a flowchart illustrating an example a process flow of an AF processing program according to the present embodiment to be executed by the CPU 40 of the digital camera 10, in the case in which the release switch is in the half-pressed state by the user. Hereinafter, the AF processing according to the present embodiment will be described with reference to FIG. 13.

First, in step 250, with respect to the first AF target region 70A$_1$, a signal amount s1 of a first electric signal output from the photoelectric conversion element 28A of the first AF pixel 28 is calculated, a signal amount s2 of a second electric signal output from the photoelectric conversion element 30A of the second AF pixel 30 is calculated, and thus an absolute value d3 of the difference between the signal amount s1 and the signal amount s2 is calculated.

Next, in step 252, with respect to the second AF target region 70A$_2$, a signal amount s1 of a first electric signal output from the photoelectric conversion element 28A of the first AF pixel 28 is calculated, a signal amount s2 of a second electric signal output from the photoelectric conversion element 30A of the second AF pixel 30 is calculated, and thus an absolute value d4 of the difference between the signal amount s1 and the signal amount s2 is calculated.

In step 254, it is determined whether the absolute value d3 of the difference calculated by the process of the step 250 is equal to or more than the predetermined threshold value "X" and whether or not the absolute value d4 of the difference calculated by the process of the step 252 is equal to or more than the threshold value "X". At this time, if the determination is negative, the process proceeds to step 256.

In step 256, it is determined whether or not the absolute value d3 of the difference calculated by the process of the step 250 is greater than the absolute value d4 of the difference calculated by the process of the step 252. At this time, if the determination is affirmative, the process proceeds to step 258; on the other hand, if the determination is negative, the process proceeds to step 260.

In step 258, the phase-difference AF function is activated as the AF control by performing the correlation computation based on the signal amount s1 of the electric signal output from the photoelectric conversion element 28A of the first AF pixel 28 and the signal amount s2 of the electric signal output from the photoelectric conversion element 30A of the second AF pixel 30, with respect to the second AF target region 70A$_2$, and then the AF processing program ends.

In step 260, the phase-difference AF function is activated as the AF control by performing the correlation computation based on the signal amount s1 of the electric signal output from the photoelectric conversion element 28A of the first AF pixel 28 and the signal amount s2 of the electric signal output from the photoelectric conversion element 30A of the second AF pixel 30, with respect to the first AF target region 70A$_1$, and then the AF processing program ends.

Meanwhile, if the determination is affirmative in step 254, the process proceeds to step 262 and the contrast AF function is activated as the AF control using the digital image data obtained by the imaging pixel 26, which is included in the first AF target region 70A$_1$ and the second AF target region 70A$_2$ (here, as an example, the first AF target region 70A$_1$) equal to the first AF pixel 28 and the second AF pixel 30 served in the process of the steps 250 and 252 (here, as an example, step 250), at the present moment, with respect to the first AF target region 70A$_1$ or the second AF target region 70A$_2$ (here, as an example, the first AF target region 70A$_1$). Then, the AF processing program ends.

As described in detail above, in the digital camera 10 according to the present embodiment, the photoelectric conversion element 28A of the first AF pixel 28 and the photoelectric conversion element 30A of the second AF pixel 30 are arranged in each of the first AF target region 70A$_1$ and the second AF target region 70A$_2$ as a plurality of split regions obtained by splitting the AF target region 70, and the CPU 40 performs the control to actuate the AF function using the light incident to one region out of the first AF target region 70A$_1$ or the second AF target region 70A$_2$, in which the absolute value of the difference between the signal amount of the electrical signal output from the photoelectric conversion element 28A of the first AF pixel 28 and the signal amount of the electrical signal output from the photoelectric conversion element 30A of the second AF pixel 30 is smaller. Therefore, the digital camera 10 according to the present embodiment can obtain high reliability with respect to the accuracy in the focus detection as compared with that not having this configuration.

Figure 14:
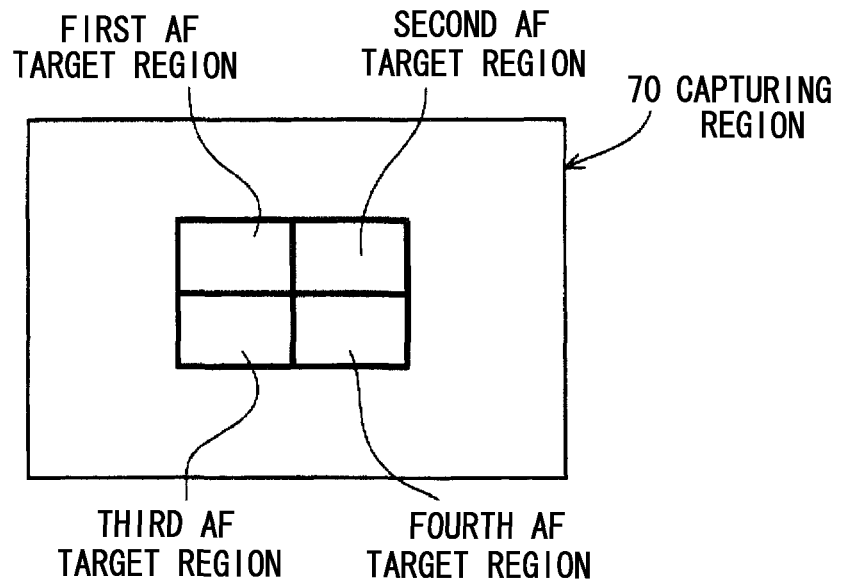
FIG. 14 is a schematic view illustrating a modified example of the AF target region according to the fourth embodiment.
Figure 15A:
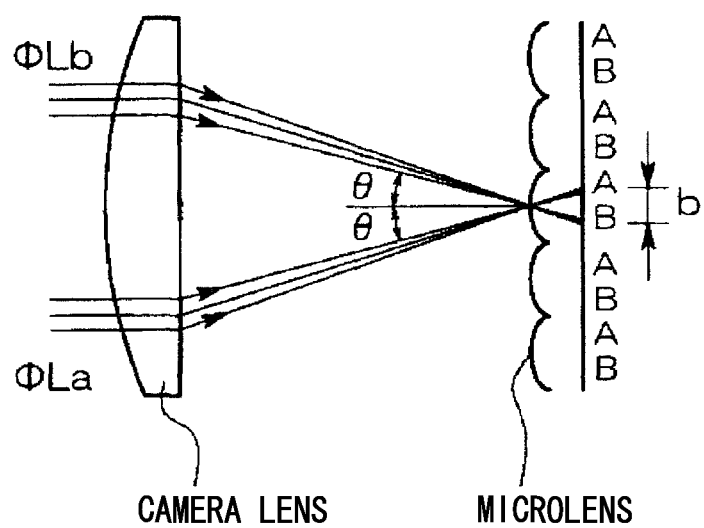
FIG. 15A is a schematic side view which explains a principle of a phase-difference AF system.
Figure 15B:
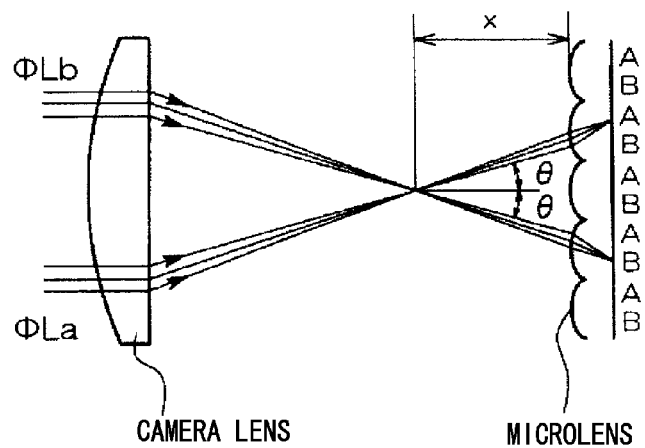
FIG. 15B is a schematic side view which explains the principle of the phase-difference AF system.
Figure 16:
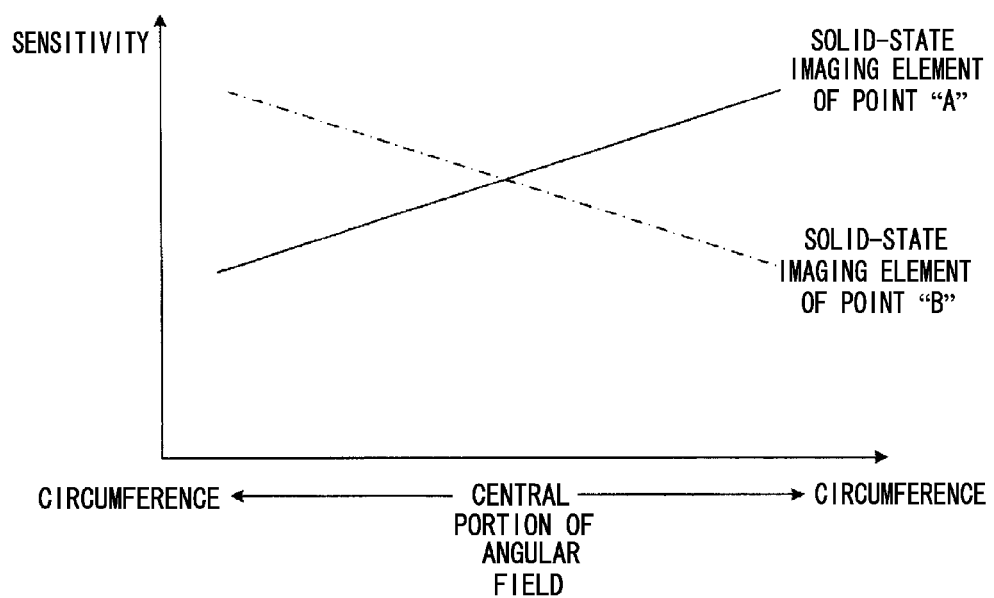
FIG. 16 is a graph illustrating a correlation between sensitivity and position of each solid-state imaging element of point "A" and point "B" illustrated in FIG. 15.

Furthermore, in the present embodiment, the example of the case of two-splitting the AF target region 70 is described, but the number of splits of the AF target region 70 may be multiple. For example, as illustrated in FIG. 14, the AF target region 70 may be four-split into first to fourth AF target regions. In this case, it is possible to obtain the high reliability with respect to the accuracy in the focus detection and to actuate the phase-difference AF function with high probability, as compared with the case of two-split illustrated in FIG. 12B.

Further, the present embodiment described an example of the case of arranging the pair of first AF pixel 28 and second AF pixel 30 in each of the first AF target region 70A$_1$ and the second AF target region 70A$_2$, but is not limited thereto. That is, the photoelectric conversion element 59 having the first split photoelectric conversion unit 62A, the second split photoelectric conversion unit 62B, the third split photoelectric conversion unit 62C, and the fourth split photoelectric conversion unit 62D may be arranged in each of the first AF target region 70A$_1$ and the second AF target region 70A$_2$. In this case, the AF function may be activated using the light incident to the AF target region out of the first AF target region 70A$_1$ and the second AF target region 70A$_2$, in which the total value of the signal amount of the electric signal obtained from the first split photoelectric conversion unit 62A, the signal amount of the electric signal obtained from the second split photoelectric conversion unit 62B, the signal amount of the electric signal obtained from the third split photoelectric conversion unit 62C, and the signal amount of the electric signal obtained from the fourth split photoelectric conversion unit 62D is the minimum.

Figure 17:
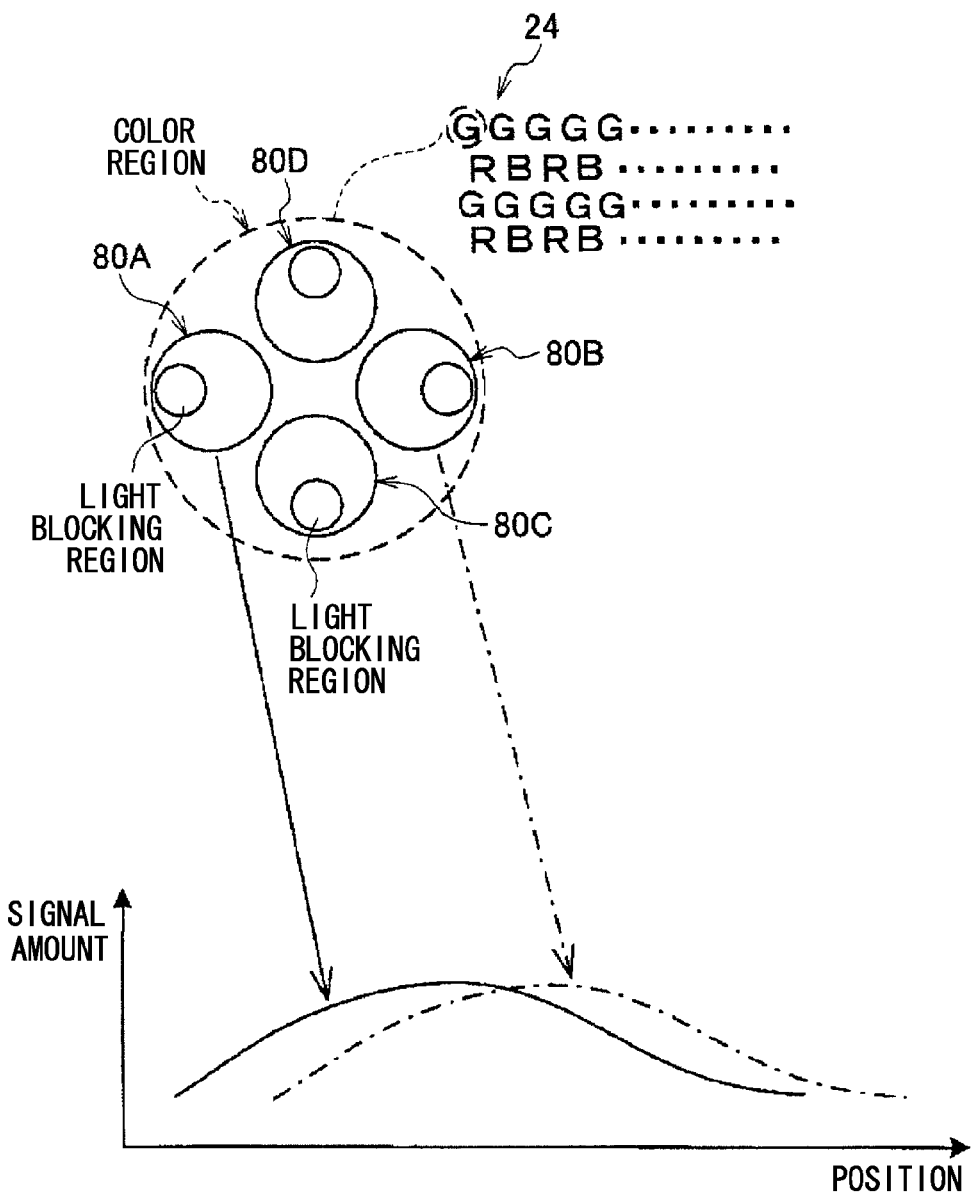
FIG. 17 is a diagram which explains a modified example of the phase-difference AF function according to the second to fourth embodiments; an upper part illustrates a modified example (first modified example) of pixel configuration, and a lower part is a graph illustrating a correlation of a signal amount obtained by one of paired light receiving unit in a horizontal direction and a position thereof and a correlation of a signal amount obtained by the other light receiving unit in a horizontal direction and a position thereof.

Further, the second to fourth embodiments describe the case where each pixel constituting the CCD 24 belongs to any one of the capturing photoelectric conversion element 26 or the focusing photoelectric conversion element 60, but the present invention is not limited thereto. That is, in order to achieve the phase-difference AF function and the contrast AF function according to the present invention, it is not necessary to divide into the capturing photoelectric conversion element and the focusing photoelectric conversion element. In this case, each pixel may be configured, for example, as follow. For example, even in the case in which a RGB color region (color pixel (larger pixel) indicting specific single color) is arrayed in a honeycomb form and where each color region is configured to include a plurality of pixels (smaller pixels) having the same color, it is possible to apply the present invention. In an example illustrated in FIG. 17, the CCD 24 is configured such that a row (=pixel column) of color region in an even-numbered row (=even-numbered column) is shifted by ½ pixel pitch with respect to a row (=column in color region) in color region of an odd-numbered row (=odd-numbered column). Further, the CCD 24 is configured such that a first color ("G" in the example illustrated in FIG. 17) is arranged in the color region of the odd-numbered row and such that a second color ("R" in the example illustrated in FIG. 17) and a third color ("B" in the example illustrated in FIG. 17) are alternately arranged every row in the color region of the even-numbered row. In this case, as illustrated in FIG. 17, each of the color regions is configured such that a first light receiving unit 80A and a second light receiving unit 80B as a plurality of horizontal light receiving unit in the horizontal direction and a third light receiving unit 80C and a fourth light receiving unit 80D as a plurality of vertical light receiving unit in the vertical direction are two-dimensionally arranged, as an example. Then, a light blocking region is formed in a portion of left-half region of one light receiving unit (the first light receiving unit 80A in the example illustrated in FIG. 17) of the paired first light receiving unit 80A and second light receiving unit 80B which constitute a pair pixel in the horizontal direction, and a light blocking region is formed in a portion of right-half region of the other light receiving unit (the second light receiving unit 80B in the example illustrated in FIG. 17) so as to be line-symmetrically arranged with respect to the light blocking region of one first light receiving unit. Further, a light blocking region is formed in a portion of lower-half region of one light receiving unit (the third light receiving unit 80C in the example illustrated in FIG. 17) of the paired third light receiving unit 80C and fourth light receiving unit 80D which constitute a pair pixel in the vertical direction, and a light blocking region is formed in a portion of upper-half region of the other light receiving unit (the fourth light receiving unit 80D in the example illustrated in FIG. 17) so as to be line-symmetrically arranged with respect to the light blocking region of one first light receiving unit.

In the CCD 24 configured in this manner, as illustrated in a lower graph of FIG. 17 as an example, an amount of phase difference appears by misalignment between a feature indicating the signal amount of one light receiving unit of the paired light receiving units in a specific direction (one direction of the horizontal direction and the vertical direction) and a feature of the signal amount of the other light receiving unit. Therefore, in the paired light receiving units in the direction (horizontal direction or vertical direction) corresponding to a larger one of the degree of coincidence of the signal amount between the electric signals obtained by the paired light receiving unit (as an example, the first light receiving unit 80A and the second light receiving unit 80B) in the horizontal direction or the degree of coincidence of the signal amount between the electric signals obtained by the paired light receiving unit (as an example, the third light receiving unit 80C and the fourth light receiving unit 80D) in the vertical direction, the phase-difference AF function is achieved by moving the capturing lens 22A to the focusing position so as to eliminate an misalignment amount between the signal amount obtained by one light receiving unit and the signal amount obtained by the other light receiving unit. For example, between the degree of coincidence of the signal amount between the electric signals obtained by the paired light receiving unit in the horizontal direction and the degree of coincidence of the signal amount between the electric signals obtained by the paired light receiving unit in the vertical direction, if the degree of coincidence of the signal amount between the electric signals obtained by the paired light receiving unit in the horizontal direction is larger, as illustrated in FIG. 17 as an example, the correlation computation is performed every row of the CCD 24 using the graph (solid graph) indicating the signal amount of the electric signal obtained from one light receiving unit (the first light receiving unit for each color region in the example illustrated in FIG. 17) of the paired first light receiving unit 80A and second light receiving unit 80B which constitute the pair pixel in the horizontal direction and the graph (graph of dashed line) indicating the signal amount of the electric signal obtained from the other light receiving unit (the second light receiving unit for each color region in the example illustrated in FIG. 17), and the focusing control is performed based on the computation result (for example, so that the solid graph and the graph of dashed line coincide with each other). Thus, the phase-difference AF function may be achieved.

Figure 18:
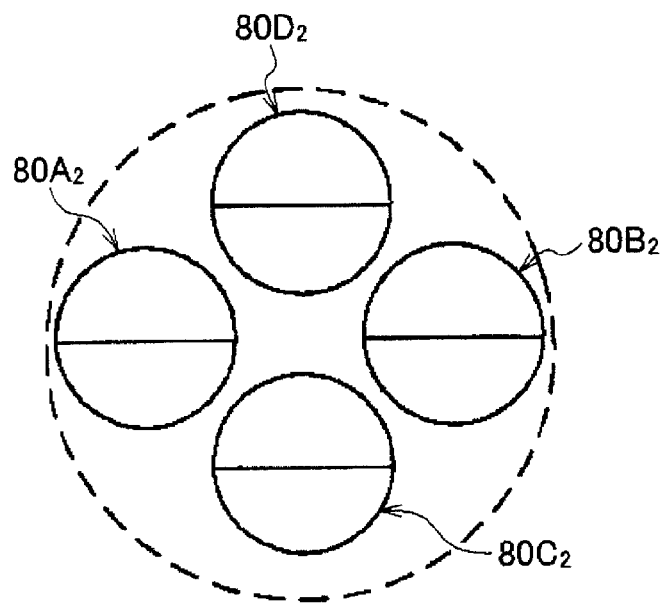
FIG. 18 is a schematic view illustrating a modified example (second modified example) of the pixel configuration.

Further, the example illustrated in FIG. 17 is configured in such a manner that a portion of left-half region of one light receiving unit of the paired first light receiving unit 80A and second light receiving unit 80B in the horizontal direction and a portion of right-half region of the other light receiving unit are blocked and that a portion of lower-half region of one light receiving unit of the paired third light receiving unit 80C and fourth light receiving unit 80D in the vertical direction and a portion of upper-half region of the other light receiving unit are blocked, but is not limited thereto. For example, as illustrated in FIG. 18, with respect to the paired first light receiving unit 80A and second light receiving unit 80B in the horizontal direction, a first light receiving unit $80A_2$, which is configured to block one of an entire region of the upper half or an entire region of the lower half, may be applied instead of the first light receiving unit 80A, and a second light receiving unit $80B_2$, which is configured such that the light blocking region is line-symmetrically arranged with the light blocking region of the first light receiving unit $80A_2$ in the horizontal direction, may be applied instead of the second light receiving unit 80B. Further, with respect to the paired third light receiving unit 80C and fourth light receiving unit 80D in the vertical direction, a third light receiving unit $80C_2$, which is configured to block one of an entire region of the upper half or an entire region of the lower half, may be applied instead of the third light receiving unit 80C, and a fourth light receiving unit $80D_2$, which is configured to block the other of the entire region of the upper half and the entire region of the lower half, may be applied instead of the fourth light receiving unit 80D.

Figure 19:
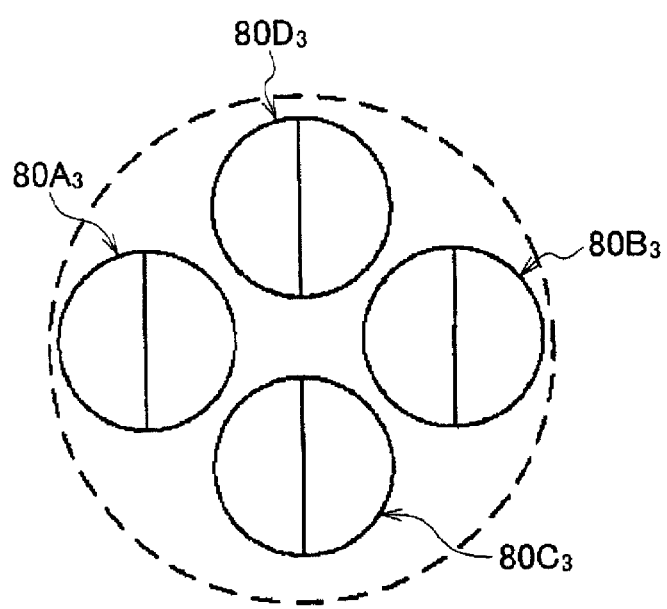
FIG. 19 is a schematic view illustrating a modified example (third modified example) of the pixel configuration.

Further, as illustrated in FIG. 19, with respect to the paired first light receiving unit 80A and second light receiving unit 80B in the horizontal direction, a first light receiving unit $80A_3$, which is configured to block one of an entire region of the left half or an entire region of the right half, may be applied instead of the first light receiving unit 80A, and a second light receiving unit $80B_3$, which is configured to block the other of the entire region of the left half and the entire region of the right half, may be applied instead of the second light receiving unit 80B. Further, with respect to the paired third light receiving unit 80C and fourth light receiving unit 80D in the vertical direction, a third light receiving unit $80C_2$, which is configured to block one of the entire region of the left half or the entire region of the right half, may be applied instead of the third light receiving unit 80C, and a fourth light receiving unit $80D_2$, which is configured such that the light blocking region is line-symmetrically arranged with the light blocking region of the third light receiving unit $80C_2$ in the vertical direction, may be applied instead of the fourth light receiving unit 80D. As described, in case of forming the light blocking region within the paired light receiving units in the same direction, the light blocking regions of both light receiving units may be line-symmetrically formed in the same direction.

Further, each of the embodiments illustrates a software form which implements each step of the AF processing program by executing the AF processing program using the CPU 40, but is not limited thereto may include a hardware form configured by connecting various circuits (as an example, ASIC (Application Specific Integrated Circuit)) and a combination of the software form and the hardware form.

Further, each of the embodiments illustrates an example in which the AF processing program is previously stored in the memory 48, but the present invention is not limited thereto. That is, the present invention may apply an embodiment for providing in a state where these programs are stored in a recording medium such as a CD-ROM, a DVD-ROM, or an USB memory to be read out by a computer and may apply an embodiment for delivering through a communication unit by wire or wireless.

The disclosure of Japanese Patent Application No. 2011-081405 is herein incorporated in its entirety by reference. All publications, patent applications, and technical standards mentioned in this specification are herein incorporated by reference to the same extent as if such individual publication, patent application, or technical standard was specifically and individually indicated to be incorporated by reference.

What is claimed is:

1. An imaging device comprising:
    a capturing lens that is movable in an optical axis direction;
    an imaging element in which a plurality of photoelectric conversion elements which include a pair of horizontal light receiving devices and a pair of vertical light receiving devices are two-dimensionally arranged, the pair of horizontal light receiving devices being aligned in a horizontal direction to receive a pair of split light of the horizontal direction which is obtained by performing a pupil split on light incident to the capturing lens in the horizontal direction, and the pair of vertical light receiving devices being aligned in a vertical direction to receive a pair of split light of the vertical direction which is obtained by performing the pupil split on light incident to the capturing lens in the vertical direction;
    a movement device that moves the capturing lens in the optical axis direction;
    a calculation device that calculates an absolute value of signal amount difference between electric signals obtained by the pair horizontal light receiving devices and an absolute value of signal amount difference between electric signals obtained by the pair vertical light receiving devices;
    a specifying device that specifies one of the pair of horizontal light receiving devices or the pair of vertical light receiving devices, in which the calculated absolute value of the signal amount difference is smaller; and
    a control device that performs correlation computation based on the signal amount of the plurality of photoelectric conversion elements which are aligned in a direction of the specified one of the pair of horizontal light receiving devices or the pair of vertical light receiving devices, and that controls the movement device so as to move the capturing lens to a focusing position based on a result of the correlation computation,
    wherein the control device controls the movement device so as to move the capturing lens to the focusing position, based on a signal amount between electric signals obtained by light receiving devices, which are paired with each other in a specified oblique direction with respect to the imaging element, out of each light receiving device of the pair of horizontal light receiving devices and the pair of vertical light receiving devices of the plurality of photoelectric conversion elements, without performing the specifying and the controlling, if both of the absolute value of signal amount difference between the electric signals obtained by the pair of horizontal light receiving devices and the absolute value of signal amount difference between the electric signals obtained by the pair of vertical light receiving devices is less than the predetermined threshold value and is equal to or greater than another predetermined threshold value that is less than the predetermined threshold value.

2. The imaging device according to claim 1, wherein the imaging device further includes a derivation device that derives the paired light receiving devices in the specified oblique direction from a plurality of oblique directions with respect to the imaging element, based on a difference between each of the absolute value of signal amount difference between the electric signals obtained by the pair of horizontal light receiving devices and the absolute value of signal amount difference between the electric signals obtained by the pair of vertical light receiving devices and the another predetermined threshold value.

3. An imaging device comprising:
    a capturing lens that is movable in an optical axis direction;
    an imaging element in which a plurality of photoelectric conversion elements which include a pair of horizontal light receiving devices and a pair of vertical light receiving devices are two-dimensionally arranged, the pair of horizontal light receiving devices being aligned in a horizontal direction to receive a pair of split light of the horizontal direction which is obtained by performing a pupil split on light incident to the capturing lens in the horizontal direction, and the pair of vertical light receiving devices being aligned in a vertical direction to receive a pair of split light of the vertical direction which is obtained by performing the pupil split on light incident to the capturing lens in the vertical direction;
    a movement device that moves the capturing lens in the optical axis direction;
    a calculation device that calculates an absolute value of signal amount difference between electric signals obtained by the pair horizontal light receiving devices and an absolute value of signal amount difference between electric signals obtained by the pair vertical light receiving devices;
    a specifying device that specifies one of the pair of horizontal light receiving devices or the pair of vertical light receiving devices, in which the calculated absolute value of the signal amount difference is smaller; and
    a control device that performs correlation computation based on the signal amount of the plurality of photoelectric conversion elements which are aligned in a direction of the specified one of the pair of horizontal light receiving devices or the pair of vertical light receiving devices, and that controls the movement device so as to move the capturing lens to a focusing position based on a result of the correlation computation,
    wherein the control device performs the specifying, the control device performs correlation computation based on the signal amount of the plurality of photoelectric conversion elements aligned in the direction of the specified one of the pair of horizontal light receiving devices or the pair of vertical light receiving devices, and the control device controls the movement device so as to move the capturing lens to a focusing position based on a result of the correlation computation, if both of the absolute value of signal amount difference between the electric signals obtained by the pair of horizontal light receiving devices and the absolute value of signal amount difference between the electric signals obtained by the pair of vertical light receiving devices are less than a predetermined threshold value, and the control device controls the movement device so as to move the capturing lens to a position on an optical axis at which an evaluation value for evaluating sharpness of an object image to be generated becomes an evaluation value at the time of focusing, based on the electric signal obtained from the imaging element, if at least one of the absolute value of signal amount difference between the electric signals obtained by the pair of horizontal light receiving devices and the absolute value of signal amount difference between the electric signals obtained by the pair of vertical light receiving devices are equal to or greater than the predetermined threshold value, wherein the control device controls the movement device so as to move the capturing lens to the focusing position, based on a signal amount between electric signals obtained by light receiving devices, which are paired with each other in a specified oblique direction with respect to the imaging element, out of each light receiving device of the pair of horizontal light receiving devices and the pair of vertical light receiving devices of the plurality of photoelectric conversion elements, without performing the specifying and the controlling, if both of the absolute value of signal amount difference between the electric signals obtained by the pair of horizontal light receiving devices and the absolute value of signal amount difference between the electric signals obtained by the pair of vertical light receiving devices is less than the predetermined threshold value and is equal to or greater than another predetermined threshold value that is less than the predetermined threshold value.

4. The imaging device according to claim 3, wherein the imaging device further includes a derivation device that derives the paired light receiving devices in the specified oblique direction from a plurality of oblique directions with respect to the imaging element, based on a difference between each of the absolute value of signal amount difference between the electric signals obtained by the pair of horizontal light receiving devices and the absolute value of signal amount difference between the electric signals obtained by the pair of vertical light receiving devices and the another predetermined threshold value.

5. A non-transitory computer readable medium that stores a program for causing a computer to function as:
 a calculation device that calculates an absolute value of signal amount difference between electric signals obtained by a pair of horizontal light receiving devices and an absolute value of signal amount difference between electric signals obtained by a pair of vertical light receiving devices, the pair of horizontal light receiving devices and the pair of vertical light receiving devices being contained in an imaging element in which a plurality of photoelectric conversion elements which include the pair of horizontal light receiving devices and the pair of vertical light receiving devices are two-dimensionally arranged, the pair of horizontal light receiving devices being aligned in a horizontal direction to receive a pair of split light of the horizontal direction which is obtained by performing a pupil split on light incident to a capturing lens in the horizontal direction, the pair of vertical light receiving devices being aligned in a vertical direction to receive a pair of split light of the vertical direction which is obtained by performing the pupil split on light incident to the capturing lens in the vertical direction, and the capturing lens being movable in an optical axis direction;
 a specifying device that specifies one of the pair of horizontal light receiving devices or the pair of vertical light receiving devices, in which the calculated absolute value of signal amount difference is smaller; and
 a control device that performs correlation computation based on the signal amount of the plurality of photoelectric conversion elements which are aligned in a direction of the specified one of the pair horizontal light receiving devices or the pair vertical light receiving devices, and that controls a movement device which moves the capturing lens in the optical axis direction so as to move the capturing lens to a focusing position based on a result of the correlation computation; and
 wherein the control device controls the movement device so as to move the capturing lens to the focusing position, based on a signal amount between electric signals obtained by light receiving devices, which are paired with each other in a specified oblique direction with respect to the imaging element, out of each light receiving device of the pair of horizontal light receiving devices and the pair of vertical light receiving devices of the plurality of photoelectric conversion elements, without performing the specifying and the controlling, if both of the absolute value of signal amount difference between the electric signals obtained by the pair of horizontal light receiving devices and the absolute value of signal amount difference between the electric signals obtained by the pair of vertical light receiving devices is less than the predetermined threshold value and is equal to or greater than another predetermined threshold value that is less than the predetermined threshold value.

6. The non-transitory computer readable medium according to claim 5, further including a derivation device that derives the paired light receiving devices in the specified oblique direction from a plurality of oblique directions with respect to the imaging element, based on a difference between each of the absolute value of signal amount difference between the electric signals obtained by the pair of horizontal light receiving devices and the absolute value of signal amount difference between the electric signals obtained by the pair of vertical light receiving devices and the another predetermined threshold value.

7. A non-transitory computer readable medium that stores a program for causing a computer to function as:
 a calculation device that calculates an absolute value of signal amount difference between electric signals obtained by a pair of horizontal light receiving devices and an absolute value of signal amount difference between electric signals obtained by a pair of vertical light receiving devices, the pair of horizontal light receiving devices and the pair of vertical light receiving devices being contained in an imaging element in which a plurality of photoelectric conversion elements which include the pair of horizontal light receiving devices and the pair of vertical light receiving devices are two-dimensionally arranged, the pair of horizontal light receiving devices being aligned in a horizontal direction to receive a pair of split light of the horizontal direction which is obtained by performing a pupil split on light incident to a capturing lens in the horizontal direction, the pair of vertical light receiving devices being aligned in a vertical direction to receive a pair of split light of the vertical direction which is obtained by performing the pupil split on light incident to the capturing lens in the vertical direction, and the capturing lens being movable in an optical axis direction;
 a specifying device that specifies one of the pair of horizontal light receiving devices or the pair of vertical light receiving devices, in which the calculated absolute value of signal amount difference is smaller; and a control device that performs correlation computation based on the signal amount of the plurality of photoelectric conversion elements which are aligned in a direction of the specified one of the pair horizontal light receiving devices or the pair vertical light receiving devices, and that controls a movement device which moves the capturing lens in the optical axis direction so as to move the capturing lens to a focusing position based on a result of the correlation computation, wherein the control device controls the movement device so as to move the capturing lens to the focusing position, based on a signal amount between electric signals obtained by light receiving devices, which are paired with each other in a specified oblique direction with respect to the imaging element, out of each light receiving device of the pair of horizontal light receiving device and the pair of vertical light receiving devices of the plurality of photoelectric conversion elements, without performing the specifying and the controlling, if both of the absolute value of signal amount difference between the electric signals obtained by the pair of horizontal light receiving devices and the absolute value of signal amount difference between the electric signals obtained by the pair of vertical light receiving devices is less than the predetermined threshold value and is equal to or greater than another predetermined threshold value that is less than the predetermined threshold value.

8. The non-transitory computer readable medium according to claim 7, wherein the imaging device further includes a derivation devices that derives the paired light receiving devices in the specified oblique direction from a plurality of oblique directions with respect to the imaging element, based on a difference between each of the absolute value of signal amount difference between the electric signals obtained by the pair of horizontal light receiving devices and the absolute value of signal amount difference between the electric signals obtained by the pair of vertical light receiving devices and the another predetermined threshold value.

* * * * *